United States Patent
Sakashita

(10) Patent No.: US 12,270,895 B2
(45) Date of Patent: Apr. 8, 2025

(54) INFORMATION PROCESSING APPARATUS, INFORMATION PROCESSING METHOD, PROGRAM, MOBILE-OBJECT CONTROL APPARATUS, AND MOBILE OBJECT

(71) Applicant: Sony Semiconductor Solutions Corporation, Kanagawa (JP)

(72) Inventor: Tatsuya Sakashita, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 630 days.

(21) Appl. No.: 17/297,381

(22) PCT Filed: Nov. 22, 2019

(86) PCT No.: PCT/JP2019/045743
§ 371 (c)(1),
(2) Date: May 26, 2021

(87) PCT Pub. No.: WO2020/116195
PCT Pub. Date: Jun. 11, 2020

(65) Prior Publication Data
US 2022/0036043 A1    Feb. 3, 2022

(30) Foreign Application Priority Data
Dec. 7, 2018 (JP) .................. 2018-230061

(51) Int. Cl.
*G01S 13/86* (2006.01)
*G01S 17/89* (2020.01)
(Continued)

(52) U.S. Cl.
CPC ............ *G01S 13/867* (2013.01); *G01S 17/89* (2013.01); *G06F 18/214* (2023.01); *G06N 20/00* (2019.01);
(Continued)

(58) Field of Classification Search
CPC ................... G01S 13/867; G01S 17/89; G01S 2013/9323; G01S 7/417; G01S 13/89;
(Continued)

(56) References Cited

U.S. PATENT DOCUMENTS

2013/0148855 A1* 6/2013 Yasugi .................. G01S 13/867
382/103
2014/0205139 A1* 7/2014 Kriel ...................... G06V 20/58
382/103

(Continued)

FOREIGN PATENT DOCUMENTS

| CN | 102806867 A | 12/2012 |
|---|---|---|
| JP | 2005-175603 A | 6/2005 |

(Continued)

OTHER PUBLICATIONS

International Search Report and English translation thereof mailed Feb. 25, 2020 in connection with International Application No. PCT/JP2019/045743.

(Continued)

*Primary Examiner* — Chan S Park
*Assistant Examiner* — Daniel C Chang
(74) *Attorney, Agent, or Firm* — Wolf, Greenfield & Sacks, P.C.

(57) ABSTRACT

The present technology relates to an information processing apparatus, an information processing method, a program, a mobile-object control apparatus, and a mobile object that make it possible to improve the accuracy in recognizing a target object.

An information processing apparatus includes a geometric transformation section that transforms at least one of a captured image or a sensor image to match coordinate systems of the captured image and the sensor image, the captured image being obtained by an image sensor, the (Continued)

sensor image indicating a sensing result of a sensor of which a sensing range at least partially overlaps a sensing range of the image sensor; and an object recognition section that performs processing of recognizing a target object on the basis of the captured image and sensor image of which the coordinate systems have been matched to each other. The present technology is applicable to, for example, a system used to recognize a target object around a vehicle.

14 Claims, 20 Drawing Sheets

(51) Int. Cl.
    *G06F 18/214* (2023.01)
    *G06N 20/00* (2019.01)
    *G06T 3/16* (2024.01)
    *G06V 10/24* (2022.01)
    *G06V 20/56* (2022.01)
    *G06V 20/64* (2022.01)

(52) U.S. Cl.
    CPC .............. *G06T 3/16* (2024.01); *G06V 20/56* (2022.01); *G06V 20/64* (2022.01); *G06V 10/247* (2022.01)

(58) Field of Classification Search
    CPC .... G01S 7/2955; G01S 7/4808; G01S 13/865; G01S 13/931; G01S 17/931; G01S 2013/93271; G06F 18/214; G06N 20/00; G06N 3/08; G06T 3/0087; G06T 3/0093; G06T 3/40; G06T 7/11; G06T 2207/20081; G06T 2207/20084; G06V 20/56; G06V 20/64; G06V 10/247
    See application file for complete search history.

(56) References Cited

U.S. PATENT DOCUMENTS

| | | | | |
|---|---|---|---|---|
| 2020/0160559 | A1* | 5/2020 | Urtasun | .............. G06T 7/55 |
| 2020/0301013 | A1* | 9/2020 | Banerjee | ............. G01S 17/931 |
| 2022/0058428 | A1* | 2/2022 | Matsunaga | ............. G01S 17/89 |

FOREIGN PATENT DOCUMENTS

| | | | |
|---|---|---|---|
| JP | 2017-102838 | A | 6/2017 |
| JP | 2017-142613 | A | 8/2017 |
| JP | 2017149686 | | 8/2017 |
| JP | 2018097807 | A | 6/2018 |
| JP | 2018-120373 | A | 8/2018 |
| JP | 2018535491 | A | 11/2018 |
| JP | 2019028861 | A | 2/2019 |
| KR | 101920281 | B1 * | 11/2018 |
| WO | WO 2018/101247 | A1 | 6/2018 |
| WO | WO 2018/173819 | A1 | 9/2018 |
| WO | WO-2019012632 | A1 | 1/2019 |

OTHER PUBLICATIONS

Written Opinion and English translation thereof mailed Feb. 25, 2020 in connection with International Application No. PCT/JP2019/045743.
International Preliminary Report on Patentability and English translation thereof mailed Jun. 8, 2021 in connection with International Application No. PCT/JP2019/045743.
Extended European Search Report issued Jan. 4, 2022 in connection with European Application No. 19891813.8.
Gu et al., 3-d lidar+ monocular camera: An inverse-depth-induced fusion framework for urban road detection. IEEE Transactions on Intelligent Vehicles. Jun. 1, 2018;3(3):351-60.
Kim et al., Robust Deep Multi-modal Learning Based on Gated Information Fusion Network. arXiv preprint arXiv:1807.06233. Jul. 1, 20187.
Kim et al., Pedestrian detection with simplified depth prediction. 2018 21st International Conference on Intelligent Transportation Systems (ITSC) Nov. 4, 2018: 2712-17.
Kim et al., Robust camera lidar sensor fusion via deep gated information fusion network. 2018 IEEE Intelligent Vehicles Symposium (IV) Jun. 26, 2018:1620-25.
Liang et al., Deep Continuous Fusion for Multi-sensor 3D Object Detection. European Conference on Computer Vision. Springer, Cham. Sep. 8, 2018:663-78.

* cited by examiner

INFORMATION PROCESSING APPARATUS, INFORMATION PROCESSING METHOD, PROGRAM, MOBILE-OBJECT CONTROL APPARATUS, AND MOBILE OBJECT

CROSS-REFERENCE TO RELATED APPLICATIONS

The present application claims the benefit under 35 U.S.C. § 371 as a U.S. National Stage Entry of International Application No. PCT/JP2019/045743, filed in the Japanese Patent Office as a Receiving Office on Nov. 22, 2019, which claims priority to Japanese Patent Application Number JP2018-230061, filed in the Japanese Patent Office on Dec. 7, 2018, each of which applications is hereby incorporated by reference to the maximum extent permitted under the law.

TECHNICAL FIELD

The present technology relates to an information processing apparatus, an information processing method, a program, a mobile-object control apparatus, and a mobile object, and in particular, to an information processing apparatus, an information processing method, a program, a mobile-object control apparatus, and a mobile object that are intended to improve the accuracy in recognizing a target object.

BACKGROUND ART

It has been proposed, in the past, that location information regarding an obstacle that is detected by a millimeter-wave radar be superimposed to be displayed on a captured image using a projection transformation performed with respect to a radar plane and a captured-image plane (for example, refer to Patent Literature 1).

CITATION LIST

Patent Literature

Patent Literature 1: Japanese Patent Application Laid-open No. 2005-175603

DISCLOSURE OF INVENTION

Technical Problem

However, Patent Literature 1 does not discuss improving the accuracy in recognizing a target object such as a vehicle using a camera and a millimeter-wave radar.

The present technology has been made in view of the circumstances described above, and is intended to improve the accuracy in recognizing a target object.

An information processing apparatus according to a first aspect of the present technology includes a geometric transformation section that transforms at least one of a captured image or a sensor image to match coordinate systems of the captured image and the sensor image, the captured image being obtained by an image sensor, the sensor image indicating a sensing result of a sensor of which a sensing range at least partially overlaps a sensing range of the image sensor; and an object recognition section that performs processing of recognizing a target object on the basis of the captured image and sensor image of which the coordinate systems have been matched to each other.

An information processing method according to the first aspect of the present technology is performed by the information processing apparatus, the information processing method including transforming at least one of a captured image or a sensor image, and matching coordinate systems of the captured image and the sensor image, the captured image being obtained by the image sensor, the sensor image indicating a sensing result of the sensor of which a sensing range at least partially overlaps a sensing range of the image sensor; and performing processing of recognizing a target object on the basis of the captured image and sensor image of which the coordinate systems have been matched to each other.

A program according to the first aspect of the present technology causes a computer to perform a process including transforming at least one of a captured image or a sensor image, and matching coordinate systems of the captured image and the sensor image, the captured image being obtained by the image sensor, the sensor image indicating a sensing result of the sensor of which a sensing range at least partially overlaps a sensing range of the image sensor; and performing processing of recognizing a target object on the basis of the captured image and sensor image of which the coordinate systems have been matched to each other.

A mobile-object control apparatus according to a second aspect of the present technology includes a geometric transformation section that transforms at least one of a captured image or a sensor image to match coordinate systems of the captured image and the sensor image, the captured image being obtained by an image sensor that captures an image of surroundings of a mobile object, the sensor image indicating a sensing result of a sensor of which a sensing range at least partially overlaps a sensing range of the image sensor; an object recognition section that performs processing of recognizing a target object on the basis of the captured image and sensor image of which the coordinate systems have been matched to each other; and a movement controller that controls movement of the mobile object on the basis of a result of the recognition of the target object.

A mobile-object control apparatus according to a third aspect of the present technology includes an image sensor; a sensor of which a sensing range at least partially overlaps a sensing range of the image sensor; a geometric transformation section that transforms at least one of a captured image or a sensor image to match coordinate systems of the captured image and the sensor image, the captured image being obtained by the image sensor, the sensor image indicating a sensing result of the sensor; an object recognition section that performs processing of recognizing a target object on the basis of the captured image and sensor image of which the coordinate systems have been matched to each other; and a movement controller that controls movement on the basis of a result of the recognition of the target object.

In the first aspect of the present technology, at least one of a captured image or a sensor image is transformed to match coordinate systems of the captured image and the sensor image, the captured image being obtained by the image sensor, the sensor image indicating a sensing result of the sensor of which a sensing range at least partially overlaps a sensing range of the image sensor; and processing of recognizing a target object is performed on the basis of the captured image and sensor image of which the coordinate systems have been matched to each other.

In the second aspect of the present technology, at least one of a captured image or a sensor image is transformed to match coordinate systems of the captured image and the sensor image, the captured image being obtained by the image sensor that captures an image of surroundings of a mobile object, the sensor image indicating a sensing result of the sensor of which a sensing range at least partially overlaps a sensing range of the image sensor; processing of recognizing a target object is performed on the basis of the captured image and sensor image of which the coordinate systems have been matched to each other; and movement of the mobile object is controlled on the basis of a result of the recognition of the target object.

In the third aspect of the present technology, at least one of a captured image or a sensor image is transformed to match coordinate systems of the captured image and the sensor image, the captured image being obtained by the image sensor, the sensor image indicating a sensing result of the sensor of which a sensing range at least partially overlaps a sensing range of the image sensor; processing of recognizing a target object is performed on the basis of the captured image and sensor image of which the coordinate systems have been matched to each other; and movement is controlled on the basis of a result of the recognition of the target object.

MODE(S) FOR CARRYING OUT THE INVENTION

Embodiments for carrying out the present technology are described below. The description is made in the following order.

1. First Embodiment (First Example of Using Camera and Millimeter-Wave Radar)
2. Second Embodiment (Example of Cutting Out Image)
3. Third Embodiment (First Example of Using Camera, Millimeter-Wave Radar, and LiDAR)
4. Fourth Embodiment (Second Example of Using Camera and Millimeter-Wave Radar)
5. Fifth Embodiment (Second Example of Using Camera, Millimeter-Wave Radar, and LiDAR)
6. Sixth Embodiment (Third Example of Using Camera and Millimeter-Wave Radar)
7. Seventh Embodiment (Fourth Example of Using Camera and Millimeter-Wave Radar)
8. Modifications
9. Others 1. First Embodiment First, a first embodiment of the present technology is described with reference to FIGS. 1 to 13.

<Example of Configuration of Vehicle Control System 100>

Figure 1:
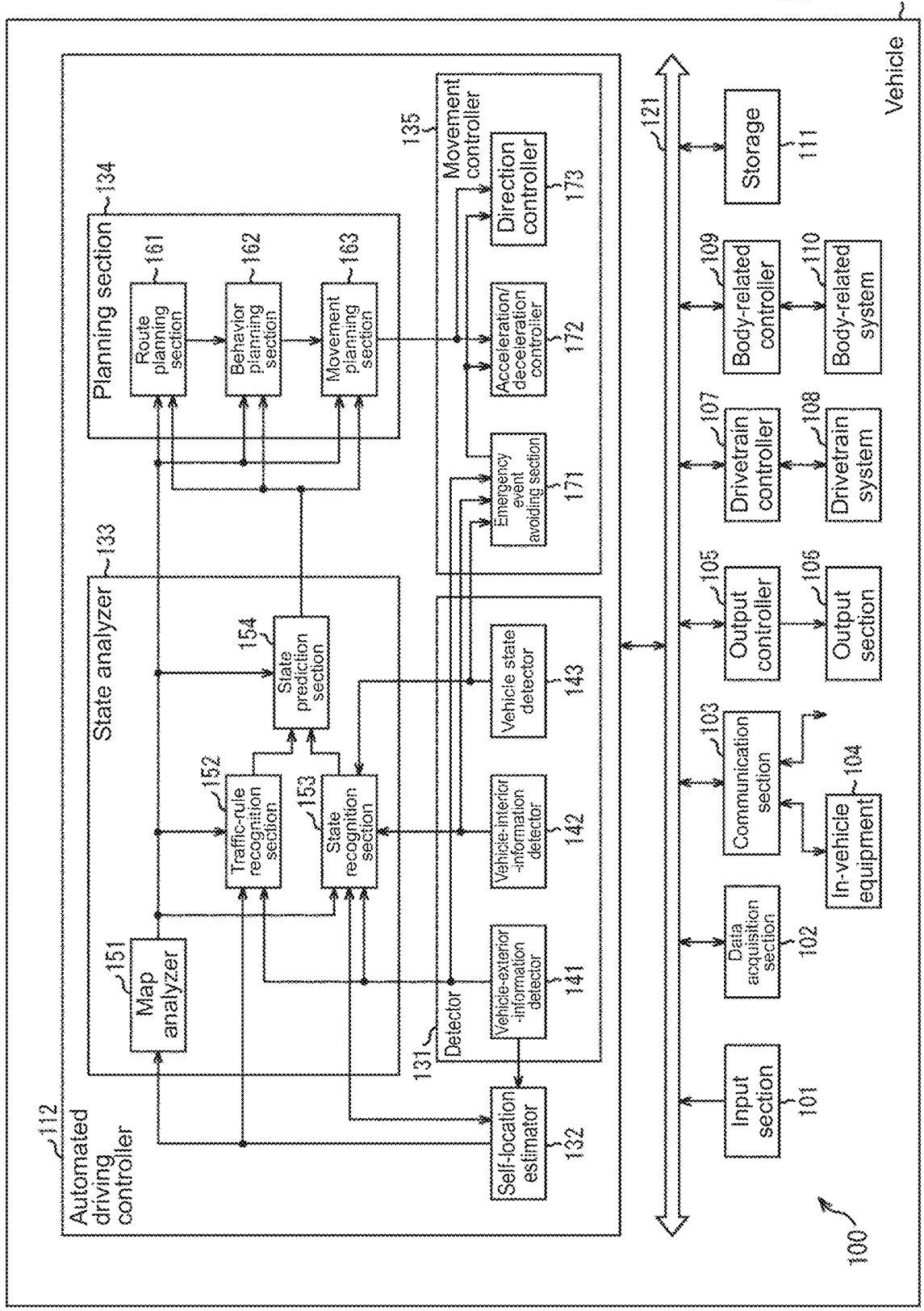
FIG. 1 is a block diagram illustrating an example of a configuration of a vehicle control system to which the present technology is applied.

FIG. 1 is a block diagram illustrating an example of a schematic functional configuration of a vehicle control system 100 that is an example of a mobile-object control system to which the present technology is applicable.

Note that, when a vehicle 10 provided with the vehicle control system 100 is to be distinguished from other vehicles, the vehicle provided with the vehicle control system 100 will be hereinafter referred to as an own automobile or an own vehicle.

The vehicle control system 100 includes an input section 101, a data acquisition section 102, a communication section 103, in-vehicle equipment 104, an output controller 105, an output section 106, a drivetrain controller 107, a drivetrain system 108, a body-related controller 109, a body-related system 110, a storage 111, and an automated driving controller 112. The input section 101, the data acquisition section 102, the communication section 103, the output controller 105, the drivetrain controller 107, the body-related controller 109, the storage 111, and the automated driving controller 112 are connected to each other through a communication network 121. For example, the communication network 121 includes a bus or a vehicle-mounted communication network compliant with any standard such as a controller area network (CAN), a local interconnect network (LIN), a local area network (LAN), or FlexRay (registered trademark). Note that the respective structural elements of the vehicle control system 100 may be directly connected to each other without using the communication network 121.

Note that the description of the communication network 121 will be omitted below when the respective structural elements of the vehicle control system 100 communicate with each other through the communication network 121. For example, when the input section 101 and the automated driving controller 112 communicate with each other through the communication network 121, it will be simply stated that the input section 101 and the automated driving controller 112 communicate with each other.

The input section 101 includes an apparatus used by a person on board to input various pieces of data, instructions, and the like. For example, the input section 101 includes an operation device such as a touch panel, a button, a microphone, a switch, and a lever; an operation device with which input can be performed by a method other than a manual operation, such as sound or a gesture; and the like. Alternatively, for example, the input section 101 may be externally connected equipment such as a remote-control apparatus using infrared or another radio wave, or mobile equipment or wearable equipment compatible with an operation of the vehicle control system 100. The input section 101 generates an input signal on the basis of data, an instruction, or the like input by a person on board, and supplies the generated input signal to the respective structural elements of the vehicle control system 100.

The data acquisition section 102 includes various sensors and the like for acquiring data used for a process performed by the vehicle control system 100, and supplies the acquired data to the respective structural elements of the vehicle control system 100.

For example, the data acquisition section 102 includes various sensors used to detect, for example, a state of the own automobile. Specifically, for example, the data acquisition section 102 includes a gyroscope; an acceleration sensor; an inertial measurement unit (IMU); and a sensor or the like used to detect an amount of operation of an accelerator pedal, an amount of operation of a brake pedal, a steering angle of a steering wheel, the number of revolutions of an engine, the number of revolutions of a motor, a speed of wheel rotation, or the like.

Further, for example, the data acquisition section 102 includes various sensors used to detect information regarding the outside of the own automobile. Specifically, for example, the data acquisition section 102 includes an image-capturing apparatus such as a time-of-flight (ToF) camera, a stereo camera, a monocular camera, an infrared camera, and other cameras. Furthermore, for example, the data acquisition section 102 includes an environment sensor used to detect weather, a meteorological phenomenon, or the like, and a surrounding-information detection sensor used to detect an object around the own automobile. For example, the environment sensor includes a raindrop sensor, a fog sensor, a sunshine sensor, a snow sensor, and the like. The surrounding-information detection sensor includes an ultrasonic sensor, a radar, LiDAR (light detection and ranging, laser imaging detection and ranging), a sonar, and the like.

Moreover, for example, the data acquisition section 102 includes various sensors used to detect the current location of the own automobile. Specifically, for example, the data acquisition section 102 includes, for example, a global navigation satellite system (GNSS) receiver that receives a GNSS signal from a GNSS satellite.

Further, for example, the data acquisition section 102 includes various sensors used to detect information regarding the inside of a vehicle. Specifically, for example, the data acquisition section 102 includes an image-capturing apparatus that captures an image of a driver, a biological sensor that detects biological information of the driver, a microphone that collects sound in the interior of a vehicle, and the like. For example, the biological sensor is provided to a seat surface, the steering wheel, or the like, and detects biological information of a person on board sitting on a seat, or a driver holding the steering wheel.

The communication section 103 communicates with the in-vehicle equipment 104 as well as various pieces of vehicle-exterior equipment, a server, a base station, and the like, transmits data supplied by the respective structural elements of the vehicle control system 100, and supplies the received data to the respective structural elements of the vehicle control system 100. Note that a communication protocol supported by the communication section 103 is not particularly limited. It is also possible for the communication section 103 to support a plurality of types of communication protocols.

For example, the communication section 103 wirelessly communicates with the in-vehicle equipment 104 using a wireless LAN, Bluetooth (registered trademark), near-field communication (NFC), a wireless USB (WUSB), or the like. Further, for example, the communication section 103 communicates with the in-vehicle equipment 104 by wire using a universal serial bus (USB), a high-definition multimedia interface (HDMI) (registered trademark), a mobile high-definition link (MHL), or the like through a connection terminal (not illustrated) (and a cable if necessary).

Further, for example, the communication section 103 communicates with equipment (for example, an application server or a control server) situated in an external network (for example, the Internet, a cloud network, or a carrier-specific network) through a base station or an access point. Furthermore, for example, the communication section 103 communicates with a terminal (for example, a terminal of a pedestrian or a store, or a machine-type communication (MTC) terminal) situated near the own automobile, using a peer-to-peer (P2P) technology. Moreover, for example, the communication section 103 performs V2X communication such as vehicle-to-vehicle communication, vehicle-to-infrastructure communication, vehicle-to-home communication between the own automobile and a home, and vehicle-to-pedestrian communication. Further, for example, the communication section 103 includes a beacon receiver, receives a radio wave or an electromagnetic wave transmitted from, for example, a radio station installed on a road, and acquires information regarding, for example, the current location, traffic congestion, traffic regulation, or a necessary time.

Examples of the in-vehicle equipment 104 include mobile equipment or wearable equipment of a person on board, information equipment that is brought in or attached to the own automobile, and a navigation apparatus that searches for a route to any destination.

The output controller 105 controls output of various pieces of information to a person on board of the own automobile or to the outside of the own automobile. For example, the output controller 105 generates an output signal that includes at least one of visual information (such as image data) or audio information (such as sound data), supplies the output signal to the output section 106, and thereby controls output of the visual information and the audio information from the output section 106. Specifically, for example, the output controller 105 combines pieces of data of images captured by different image-capturing apparatuses of the data acquisition section 102, generates a bird's-eye image, a panoramic image, or the like, and supplies an output signal including the generated image to the output section 106. Further, for example, the output controller 105 generates sound data including, for example, a warning beep or a warning message alerting a danger such as collision, contact, or entrance into a dangerous zone, and supplies an output signal including the generated sound data to the output section 106.

The output section 106 includes an apparatus capable of outputting the visual information or the audio information to a person on board of the own automobile or to the outside of the own automobile. For example, the output section 106 includes a display apparatus, an instrument panel, an audio speaker, headphones, a wearable device such as an eyeglass-type display used to be worn on the person on board, a projector, a lamp, and the like. Instead of an apparatus including a commonly used display, the display apparatus included in the output section 106 may be an apparatus, such as a head-up display, a transparent display, or an apparatus including an augmented reality (AR) display function, that displays the visual information in the field of view of a driver.

The drivetrain controller 107 generates various control signals, supplies them to the drivetrain system 108, and thereby controls the drivetrain system 108. Further, the drivetrain controller 107 supplies the control signals to the structural elements other than the drivetrain system 108 as necessary to, for example, notify them of a state of controlling the drivetrain system 108.

The drivetrain system 108 includes various apparatuses related to the drivetrain of the own automobile. For example, the drivetrain system 108 includes a driving force generation apparatus, such as an internal-combustion engine and a driving motor, that generates driving force, a driving force transmitting mechanism used to transmit the driving force to wheels, a steering mechanism that adjusts the steering angle, a braking apparatus that generates a braking force, an antilock braking system (ABS), an electronic stability control (ESC) system, an electric power steering apparatus, and the like.

The body-related controller 109 generates various control signals, supplies them to the body-related system 110, and thereby controls the body-related system 110. Further, the body-related controller 109 supplies the control signals to the structural elements other than the body-related system 110 as necessary to, for example, notify them of a state of controlling the body-related system 110.

The body-related system 110 includes various body-related apparatuses provided to a vehicle body. For example, the body-related system 110 includes a keyless entry system, a smart key system, a power window apparatus, a power seat, a steering wheel, an air conditioner, various lamps (such as a headlamp, a tail lamp, a brake lamp, a blinker, and a fog lamp), and the like.

For example, the storage 111 includes a read only memory (ROM), a random access memory (RAM), a magnetic storage device such as a hard disc drive (HDD), a semiconductor storage device, an optical storage device, a magneto-optical storage device, and the like. The storage 111 stores therein various programs, data, and the like that are used by the respective structural elements of the vehicle control system 100. For example, the storage 111 stores therein map data such as a three-dimensional high-accuracy map, a global map, and a local map. The high-accuracy map is a dynamic map or the like. The global map is less accurate and covers a wider area than the high-accuracy map. The local map includes information regarding the surroundings of the own automobile.

The automated driving controller 112 performs control related to automated driving such as autonomous traveling or a driving assistance. Specifically, for example, the automated driving controller 112 performs a cooperative control intended to implement a function of an advanced driver-assistance system (ADAS) including collision avoidance or shock mitigation for the own automobile, traveling after a leading vehicle based on a distance between vehicles, traveling while maintaining a vehicle speed, a warning of collision of the own automobile, a warning of deviation of the own automobile from a lane, and the like. Further, for example, the automated driving controller 112 performs a cooperative control intended to achieve, for example, automated driving that is autonomous traveling without an operation performed by a driver. The automated driving controller 112 includes a detector 131, a self-location estimator 132, a state analyzer 133, a planning section 134, and a movement controller 135.

The detector 131 detects various pieces of information necessary to control automated driving. The detector 131 includes a vehicle-exterior-information detector 141, a vehicle-interior-information detector 142, and a vehicle state detector 143.

The vehicle-exterior-information detector 141 performs a process of detecting information regarding the outside of the own automobile on the basis of data or a signal from each structural element of the vehicle control system 100. For example, the vehicle-exterior-information detector 141 performs processes of detecting, recognizing, and tracking an object around the own automobile, and a process of detecting a distance to the object. Examples of the detection-target object include a vehicle, a person, an obstacle, a structure, a road, a traffic light, a traffic sign, and a road sign. Further, for example, the vehicle-exterior-information detector 141 performs a process of detecting an environment surrounding the own automobile. Examples of the detection-target surrounding environment include weather, temperature, humidity, brightness, and a road surface condition. The vehicle-exterior-information detector 141 supplies data indicating a result of the detection process to, for example, the self-location estimator 132; a map analyzer 151, a traffic-rule recognition section 152, and a state recognition section 153 of the state analyzer 133; and an emergency event avoiding section 171 of the movement controller 135.

The vehicle-interior-information detector 142 performs a process of detecting information regarding the inside of a vehicle on the basis of data or a signal from each structural element of the vehicle control system 100. For example, the vehicle-interior-information detector 142 performs processes of authenticating and recognizing a driver, a process of detecting a state of the driver, a process of detecting a person on board, and a process of detecting a vehicle interior environment. Examples of the detection-target state of a driver include a physical condition, a degree of arousal, a degree of concentration, a degree of fatigue, and a direction of a line of sight. Examples of the detection-target vehicle interior environment include temperature, humidity, brightness, and odor. The vehicle-interior-information detector 142 supplies data indicating a result of the detection process to, for example, the state recognition section 153 of the state analyzer 133 and the emergency event avoiding section 171 of the movement controller 135.

The vehicle state detector 143 performs a process of detecting a state of the own automobile on the basis of data or a signal from each structural element of the vehicle control system 100. Examples of the detection-target state of the own automobile include speed, acceleration, a steering angle, the presence or absence of anomaly and its details, a driving operation state, a position and an inclination of a power seat, a state of a door lock, and states of other pieces of vehicle-mounted equipment. The vehicle state detector 143 supplies data indicating a result of the detection process to, for example, the state recognition section 153 of the state analyzer 133 and the emergency event avoiding section 171 of the movement controller 135.

The self-location estimator 132 performs a process of estimating a location, a posture, and the like of the own automobile on the basis of data or signals from the respective structural elements of the vehicle control system 100, such as the vehicle-exterior-information detector 141, and the state recognition section 153 of the state analyzer 133. Further, the self-location estimator 132 generates, as necessary, a local map (hereinafter referred to as a self-location estimation map) used to estimate a self-location. For example, the self-location estimation map is a high-accuracy map using a technology such as simultaneous localization and mapping (SLAM). The self-location estimator 132 supplies data indicating a result of the estimation process to, for example, the map analyzer 151, the traffic-rule recognition section 152, and the state recognition section 153 of the state analyzer 133. Further, the self-location estimator 132 stores the self-location estimation map in the storage 111.

The state analyzer 133 performs a process of analyzing states of the own automobile and its surroundings. The state analyzer 133 includes the map analyzer 151, the traffic-rule recognition section 152, the state recognition section 153, and a state prediction section 154.

Using, as necessary, data or signals from the respective structural elements of the vehicle control system 100, such as the self-location estimator 132 and the vehicle-exterior-information detector 141, the map analyzer 151 performs a process of analyzing various maps stored in the storage 111, and constructs a map including information necessary for an automated driving process. The map analyzer 151 supplies the constructed map to, for example, the traffic-rule recognition section 152, the state recognition section 153, and the state prediction section 154, as well as a route planning section 161, a behavior planning section 162, and a movement planning section 163 of the planning section 134.

The traffic-rule recognition section 152 performs a process of recognizing traffic rules around the own automobile on the basis of data or signals from the respective structural elements of the vehicle control system 100, such as the self-location estimator 132, the vehicle-exterior-information detector 141, and the map analyzer 151. The recognition process makes it possible to recognize a location and a state of a traffic light around the own automobile, the details of traffic control performed around the own automobile, and a travelable lane. The traffic-rule recognition section 152 supplies data indicating a result of the recognition process to, for example, the state prediction section 154.

The state recognition section 153 performs a process of recognizing a state related to the own automobile on the basis of data or signals from the respective structural elements of the vehicle control system 100, such as the self-location estimator 132, the vehicle-exterior-information detector 141, the vehicle-interior-information detector 142, the vehicle state detector 143, and the map analyzer 151. For example, the state recognition section 153 performs a process of recognizing a state of the own automobile, a state of the surroundings of the own automobile, a state of a driver of the own automobile, and the like. Further, the state recognition section 153 generates, as necessary, a local map (hereinafter referred to as a state recognition map) used to recognize the state of the surroundings of the own automobile. The state recognition map is, for example, an occupancy grid map.

Examples of the recognition-target state of the own automobile include a location, a posture, and movement (such as speed, acceleration, and a movement direction) of the own automobile, as well as the presence or absence of anomaly and its details. Examples of the recognition-target state of the surroundings of the own automobile include the type and a location of a stationary object around the own automobile; the type, a location, and movement (such as speed, acceleration, and a movement direction) of a moving object around the own automobile; a structure of a road around the own automobile and a condition of the surface of the road; and weather, temperature, humidity, and brightness around the own automobile. Examples of the recognition-target state of a driver include a physical condition, a degree of arousal, a degree of concentration, a degree of fatigue, movement of a line of sight, and a driving operation.

The state recognition section 153 supplies data indicating a result of the recognition process (including a state recognition map as necessary) to, for example, the self-location estimator 132 and the state prediction section 154. Further, the state recognition section 153 stores the state-recognition map in the storage 111. The state prediction section 154 performs a process of predicting a state related to the own automobile on the basis of data or signals from the respective structural elements of the vehicle control system 100, such as the map analyzer 151, the traffic-rule recognition section 152, and the state recognition section 153. For example, the state prediction section 154 performs a process of predicting a state of the own automobile, a state of the surroundings of the own automobile, a state of a driver, and the like.

Examples of the prediction-target state of the own automobile include the behavior of the own automobile, the occurrence of anomaly in the own automobile, and a travelable distance of the own automobile. Examples of the prediction-target state of the surroundings of the own automobile include the behavior of a moving object, a change in a state of a traffic light, and a change in environment such as weather around the own automobile. Examples of the prediction-target state of a driver include the behavior and the physical condition of the driver.

The state prediction section 154 supplies data indicating a result of the prediction process to, for example, the route planning section 161, the behavior planning section 162, and the movement planning section 163 of the planning section 134 together with the data from the traffic-rule recognition section 152 and the state recognition section 153.

The route planning section 161 plans a route to a destination on the basis of data or signals from the respective structural elements of the vehicle control system 100, such as the map analyzer 151 and the state prediction section 154. For example, the route planning section 161 sets a route from the current location to a specified destination on the basis of a global map. Further, for example, the route planning section 161 changes a route as appropriate on the basis of the states of, for example, traffic congestion, an accident, traffic regulation, and a construction, as well as the physical condition of a driver. The route planning section 161 supplies data indicating the planned route to, for example, the behavior planning section 162.

On the basis of data or signals from the respective structural elements of the vehicle control system 100, such as the map analyzer 151 and the state prediction section 154, the behavior planning section 162 plans the behavior of the own automobile in order for the own automobile to travel safely on the route planned by the route planning section 161 within a time planned by the route planning section 161. For example, the behavior planning section 162 makes plans about, for example, a start to move, a stop, a travel direction (such as a forward movement, a backward movement, a left turn, a right turn, and a change in direction), a lane for traveling, a traveling speed, and passing. The behavior planning section 162 supplies data indicating the planned behavior of the own automobile to, for example, the movement planning section 163.

On the basis of data or signals from the respective structural elements of the vehicle control system 100, such as the map analyzer 151 and the state prediction section 154, the movement planning section 163 plans movement of the own automobile in order to achieve the behavior planned by the behavior planning section 162. For example, the movement planning section 163 makes plans about, for example, acceleration, deceleration, and a traveling course. The movement planning section 163 supplies data indicating the planned movement of the own automobile to, for example, an acceleration/deceleration controller 172 and a direction controller 173 of the movement controller 135.

The movement controller 135 controls movement of the own automobile. The movement controller 135 includes the emergency event avoiding section 171, the acceleration/deceleration controller 172, and the direction controller 173.

On the basis of a result of the detections performed by the vehicle-exterior-information detector 141, the vehicle-interior-information detector 142, and the vehicle state detector 143, the emergency event avoiding section 171 performs a process of detecting emergency events such as collision, contact, entrance into a dangerous zone, something unusual in a driver, and anomaly in the vehicle. When the emergency event avoiding section 171 detects the occurrence of an emergency event, the emergency event avoiding section 171 plans movement of the own automobile such as a sudden stop or a quick turning for avoiding the emergency event. The emergency event avoiding section 171 supplies data indicating the planned movement of the own automobile to, for example, the acceleration/deceleration controller 172 and the direction controller 173.

The acceleration/deceleration controller 172 controls acceleration/deceleration to achieve the movement of the own automobile planned by the movement planning section 163 or the emergency event avoiding section 171. For example, the acceleration/deceleration controller 172 computes a control target value for a driving force generation apparatus or a braking apparatus to achieve the planned acceleration, the planned deceleration, or the planned sudden stop, and supplies a control instruction indicating the computed control target value to the drivetrain controller 107.

The direction controller 173 controls a direction to achieve the movement of the own automobile planned by the movement planning section 163 or the emergency event avoiding section 171. For example, the direction controller 173 computes a control target value for a steering mechanism to achieve the traveling course planned by the movement planning section 163 or the quick turning planned by the emergency event avoiding section 171, and supplies a control instruction indicating the computed control target value to the drivetrain controller 107.

<Examples of Configurations of Data Acquisition Section 102A and Vehicle-Exterior-Information Detector 141A>

Figure 2:
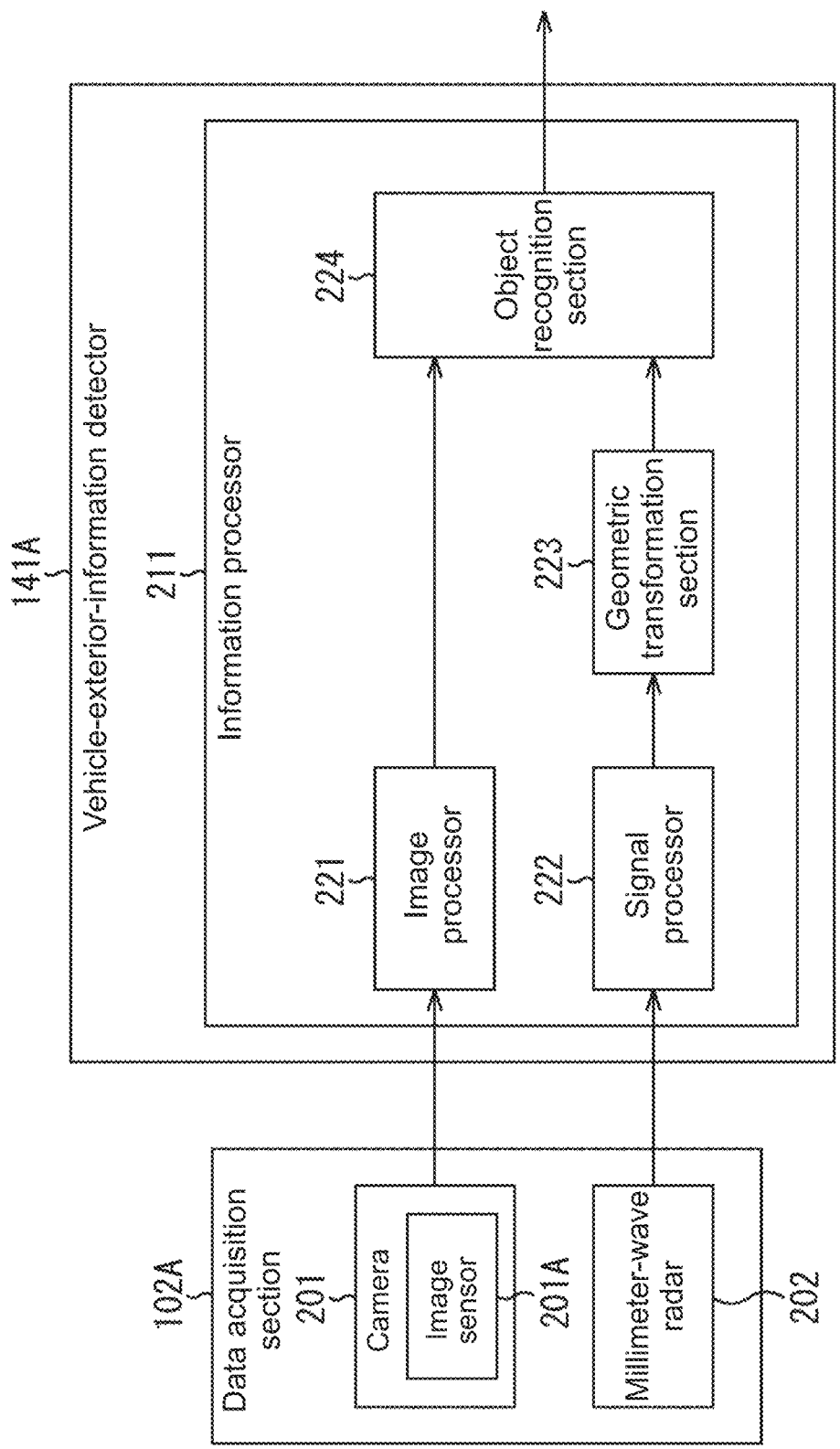
FIG. 2 is a block diagram illustrating a first embodiment of a data acquisition section and a first embodiment of a vehicle-exterior-information detector.

FIG. 2 illustrates portions of examples of configurations of a data acquisition section 102A that is a first embodiment of the data acquisition section 102 in the vehicle control system 100 of FIG. 1, and a vehicle-exterior-information detector 141A that is a first embodiment of the vehicle-exterior-information detector 141 in the vehicle control system 100 of FIG. 1.

The data acquisition section 102A includes a camera 201 and a millimeter-wave radar 202. The vehicle-exterior-information detector 141A includes an information processor 211. The information processor 211 includes an image processor 221, a signal processor 222, a geometric transformation section 223, and an object recognition section 224.

The camera 201 includes an image sensor 201A. Any type of image sensor such as a CMOS image sensor or a CCD image sensor can be used as the image sensor 201A. The camera 201 (the image sensor 201A) captures an image of a region situated ahead of the vehicle 10, and supplies the obtained image (hereinafter referred to as a captured image) to the image processor 221.

The millimeter-wave radar 202 performs sensing with respect to the region situated ahead of the vehicle 10, and sensing ranges of the millimeter-wave radar 202 and the camera 201 at least partially overlap. For example, the millimeter-wave radar 202 transmits a transmission signal including a millimeter wave in a forward direction of the vehicle 10, and receives, using a reception antenna, a reception signal that is a signal reflected off an object (a reflector) situated ahead of the vehicle 10. For example, a plurality of reception antennas is arranged at specified intervals in a lateral direction (a width direction) of the vehicle 10. Further, a plurality of reception antennas may also be arranged in the height direction. The millimeter-wave radar 202 supplies the signal processor 222 with data (hereinafter referred to as millimeter-wave data) that chronologically indicates the intensity of a reception signal received using each reception antenna.

The image processor 221 performs specified image processing on a captured image. For example, the image processor 221 performs processing of reduction in number or filtering processing with respect to a pixel in the captured image according to the image size for which the object recognition section 224 can perform processing, and reduces the number of pixels in the captured image (reduces the resolution). The image processor 221 supplies the captured image with a reduced resolution (hereinafter referred to as a low-resolution image) to the object recognition section 224.

The signal processor 222 performs specified signal processing on millimeter-wave data to generate a millimeter-wave image that is an image indicating a result of sensing performed by the millimeter-wave radar 202. Note that the signal processor 222 generates two types of millimeter-wave images that are, for example, a signal-intensity image and a speed image. The signal-intensity image is a millimeter-wave image indicating a location of each object situated ahead of the vehicle 10 and the intensity of a signal reflected off the object (a reception signal). The speed image is a millimeter-wave image indicating a location of each object situated ahead of the vehicle 10 and a relative speed of the object with respect to the vehicle 10. The signal processor 222 supplies the signal-intensity image and the speed image to the geometric transformation section 223.

The geometric transformation section 223 performs a geometric transformation on a millimeter-wave image to transform the millimeter-wave image into an image of which a coordinate system is identical to the coordinate system of a captured image. In other words, the geometric transformation section 223 transforms a millimeter-wave image into an image (hereinafter referred to as a geometrically transformed millimeter-wave image) obtained as viewed from the same viewpoint as a captured image. More specifically, the geometric transformation section 223 transforms the coordinate system of a signal-intensity image and a speed image from the coordinate system of a millimeter-wave image into the coordinate system of a captured image. Note that the signal-intensity image and the speed image on which a geometric transformation has been performed are respectively referred to as a geometrically transformed signal-intensity image and a geometrically transformed speed image. The geometric transformation section 223 supplies the geometrically transformed signal-intensity image and the geometrically transformed speed image to the object recognition section 224.

The object recognition section 224 performs processing of recognizing a target object situated ahead of the vehicle 10 on the basis of the low-resolution image, the geometrically transformed signal-intensity image, and the geometrically transformed speed image. The object recognition section 224 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135. The data indicating a result of recognizing a target object includes, for example, the location and the size of a target object in a captured image, and the type of object.

Note that the target object is an object to be recognized by the object recognition section 224, and any object may be set to be the target object. However, it is favorable that an object that includes a portion having a high reflectivity of a transmission signal of the millimeter-wave radar 202 be set to be a target object. The case in which the target object is a vehicle is appropriately described below as an example.

<Example of Configuration of Object Recognition Model 251>

Figure 3:
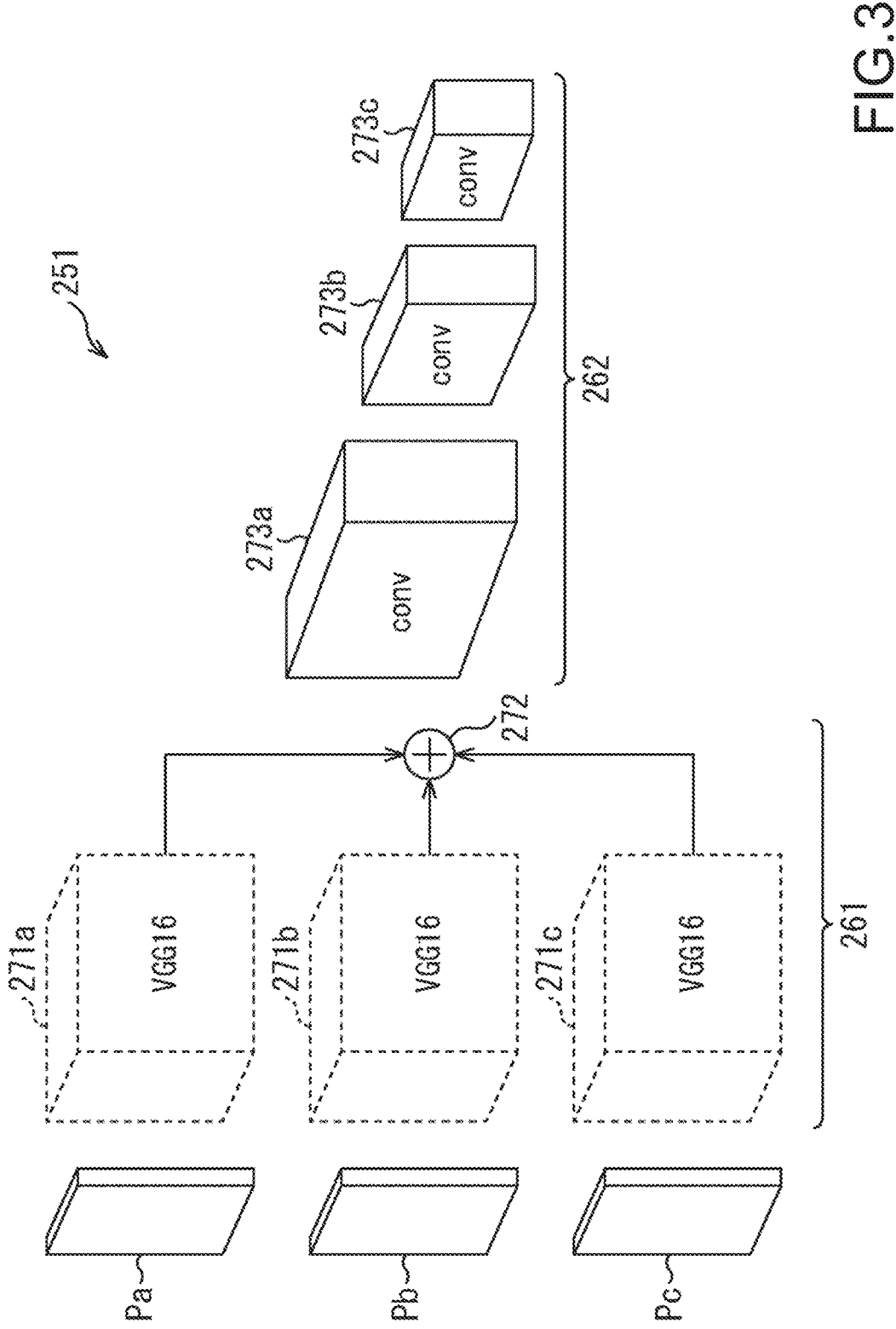
FIG. 3 illustrates an example of a configuration of an object recognition model.

FIG. 3 illustrates an example of a configuration of an object recognition model 251 used for the object recognition section 224.

The object recognition model 251 is a model obtained by machine learning. Specifically, the object recognition model 251 is a model obtained by deep learning that is a type of machine learning and uses a deep neural network. More specifically, the object recognition model 251 is made up of Single Shot MultiBox Detector (SSD), which is one of the object recognition models using a deep neural network. The object recognition model 251 includes a feature-amount extraction section 261 and a recognition section 262.

The feature-amount extraction section 261 includes VGG16 271a to VGG16 271c, which are convolutional layers using a convolutional neural network, and an adder 272.

The VGG16 271a extracts a feature amount of a captured image Pa, and generates a feature map (hereinafter referred to as a captured-image feature map) two-dimensionally representing a distribution of the feature amount. The VGG16 271a supplies the captured-image feature map to the adder 272.

The VGG16 271b extracts a feature amount of a geometrically transformed signal-intensity image Pb, and generates a feature map (hereinafter referred to as a signal-intensity-image feature map) two-dimensionally representing a distribution of the feature amount. The VGG16 271b supplies the signal-intensity-image feature map to the adder 272.

The VGG16 271c extracts a feature amount of a geometrically transformed speed image Pc, and generates a feature map (hereinafter referred to as a speed-image feature map) two-dimensionally representing a distribution of the feature amount. The VGG16 271c supplies the speed-image feature map to the adder 272.

The adder 272 adds the captured-image feature map, the signal-intensity-image feature map, and the speed-image feature map to generate a combining feature map. The adder 272 supplies the combining feature map to the recognition section 262.

The recognition section 262 includes a convolutional neural network. Specifically, the recognition section 262 includes convolutional layers 273a to 273c.

The convolutional layer 273a performs a convolution operation on the combining feature map. The convolutional layer 273a performs processing of recognizing a target object on the basis of the combining feature map on which the convolution operation has been performed. The convolutional layer 273a supplies the convolutional layer 273b with the combining feature map on which the convolution operation has been performed.

The convolutional layer 273b performs a convolution operation on the combining feature map supplied by the convolutional layer 273a. The convolutional layer 273b performs processing of recognizing the target object on the basis of the combining feature map on which the convolution operation has been performed. The convolutional layer 273a supplies the convolutional layer 273c with the combining feature map on which the convolution operation has been performed.

The convolutional layer 273c performs a convolution operation on the combining feature map supplied by the convolutional layer 273b. The convolutional layer 273b performs processing of recognizing the target object on the basis of the combining feature map on which the convolution operation has been performed.

The object recognition model 251 outputs data indicating a result of the recognition of the target object that is performed by the convolutional layers 273a to 273c.

Note that, in order from the convolutional layer 273a, the size (the number of pixels) of a combining feature map becomes smaller, and is smallest in the convolutional layer 273c. Further, if the combining feature map has a larger size, a target object having a small size, as viewed from the vehicle 10, is recognized with a higher degree of accuracy, and if the combining feature map has a smaller size, a target object having a large size, as viewed from the vehicle 10, is recognized with a higher degree of accuracy. Thus, for example, when the target object is a vehicle, a small distant vehicle is easily recognized in a combining feature map having a large size, and a large nearby vehicle is easily recognized in a combining feature map having a small size.

<Example of Configuration of Learning System 301>

Figure 4:
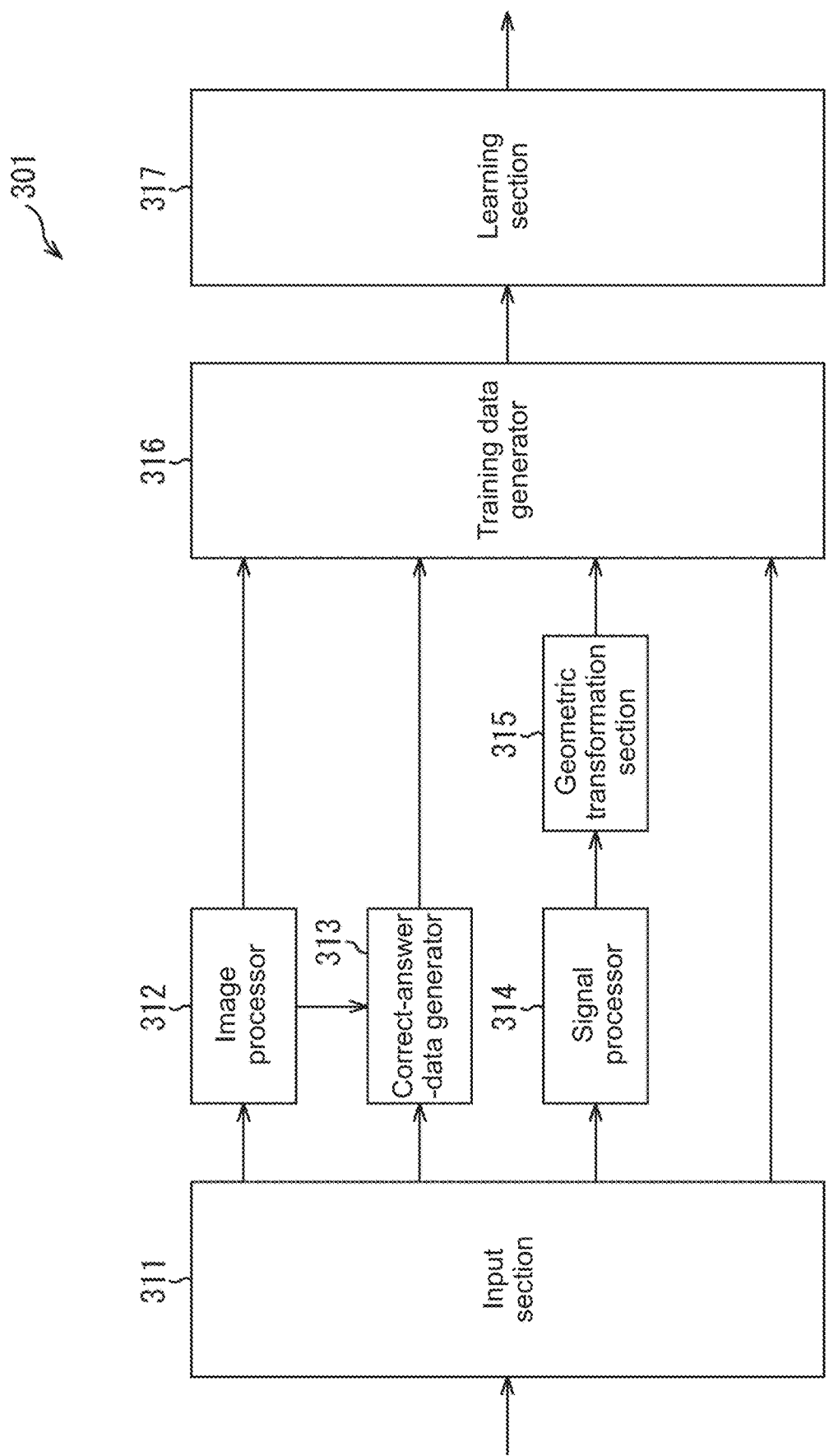
FIG. 4 illustrates an example of a configuration of a learning system.

FIG. 4 is a block diagram illustrating an example of a configuration of a learning system 301.

The learning system 301 performs learning processing on the object recognition model 251 of FIG. 3. The learning system 301 includes an input section 311, an image processor 312, a correct-answer-data generator 313, a signal processor 314, a geometric transformation section 315, a training data generator 316, and a learning section 317.

The input section 311 includes various input devices, and is used for, for example, input of data necessary to generate training data, and an operation performed by a user. For example, the input section 311 supplies a captured image to the image processor 312 when the captured image is input. For example, the input section 311 supplies millimeter-wave data to the signal processor 314 when the millimeter-wave data is input. For example, the input section 311 supplies the correct-answer-data generator 313 and the training data generator 316 with data indicating an instruction of a user that is input by an operation performed by the user.

The image processor 312 performs processing similar to the processing performed by the image processor 221 of FIG. 2. In other words, the image processor 312 performs specified image processing on a captured image to generate a low-resolution image. The image processor 312 supplies the low-resolution image to the correct-answer-data generator 313 and the training data generator 316.

The correct-answer-data generator 313 generates correct answer data on the basis of the low-resolution image. For example, a user specifies a location of a vehicle in the low-resolution image through the input section 311. The correct-answer-data generator 313 generates correct answer data indicating the location of the vehicle in the low-resolution image on the basis of the location of the vehicle that is specified by the user. The correct-answer-data generator 313 supplies the correct answer data to the training data generator 316.

The signal processor 314 performs processing similar to the processing performed by the signal processor 222 of FIG. 2. In other words, the signal processor 314 performs specified signal processing on millimeter-wave data to generate a signal-intensity image and a speed image. The signal processor 314 supplies the signal-intensity image and the speed image to the geometric transformation section 315.

The geometric transformation section 315 performs processing similar to the processing performed by the geometric transformation section 223 of FIG. 2. In other words, the geometric transformation section 315 performs a geometric transformation on the signal-intensity image and the speed image. The geometric transformation section 315 supplies the training data generator 316 with a geometrically transformed signal-intensity image and a geometrically transformed speed image that are obtained by performing the geometric transformation.

The training data generator 316 generates training data that includes input data and correct answer data, the input data including the low-resolution image, the geometrically transformed signal-intensity image, and the geometrically transformed speed image. The training data generator 316 supplies the training data to the learning section 317.

The learning section 317 performs learning processing on the object recognition model 251 using the training data. The learning section 317 outputs the object recognition model 251 that has performed learning.

<Learning Processing Performed on Object Recognition Model>

Figure 5:
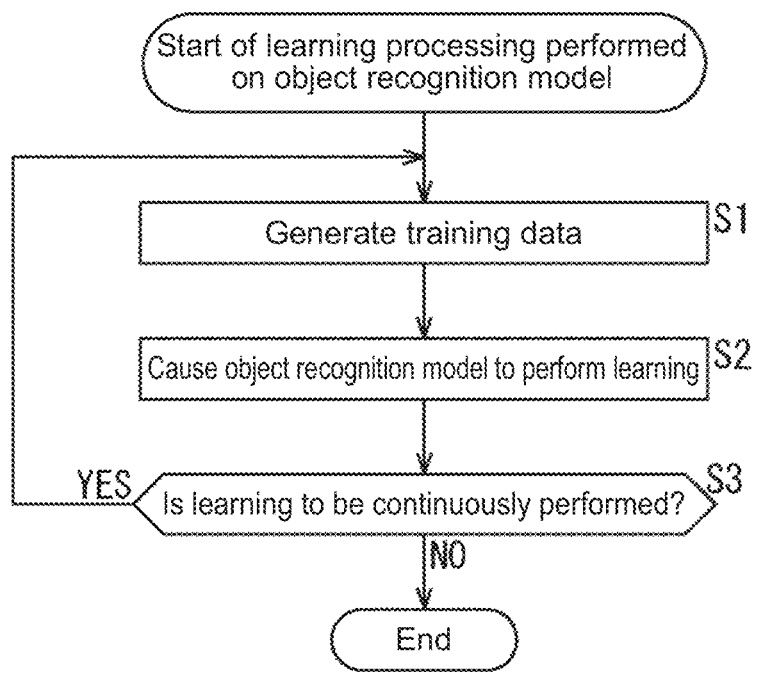
FIG. 5 is a flowchart for describing learning processing performed on the object recognition model.

Next, learning processing on an object recognition model that is performed by the learning system 301 is described with reference to a flowchart of FIG. 5.

Note that data used to generate training data is collected before this processing is started. For example, in a state in which the vehicle 10 is actually traveling, the camera 201 and the millimeter-wave radar 202 provided to the vehicle 10 perform sensing with respect to a region situated ahead of the vehicle 10. Specifically, the camera 201 captures an image of the region situated ahead of the vehicle 10, and stores an obtained captured image in the storage 111. The millimeter-wave radar 202 detects an object situated ahead of the vehicle 10, and stores obtained millimeter-wave data in the storage 111. The training data is generated on the basis of the captured image and millimeter-wave data accumulated in the storage 111.

In Step S1, the learning system 301 generates training data.

For example, a user inputs, to the learning system 301 and through the input section 311, a captured image and millimeter-wave data that are acquired at substantially the same time. In other words, the captured image and millimeter-wave data obtained by performing sensing at substantially the same point in time are input to the learning system 301. The captured image is supplied to the image processor 312, and the millimeter-wave data is supplied to the signal processor 314.

The image processor 312 performs image processing, such as processing of reduction in number, with respect to the captured image, and generates a low-resolution image. The image processor 312 supplies the low-resolution images to the correct-answer-data generator 313 and the training data generator 316.

Figure 6:
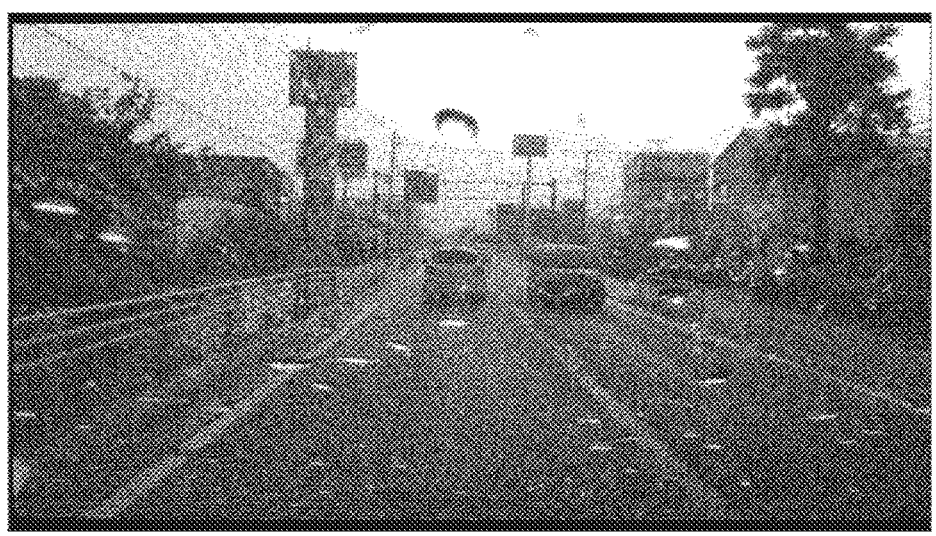
FIG. 6 illustrates an example of a low-resolution image.

FIG. 6 illustrates an example of a low-resolution image.

The correct-answer-data generator 313 generates correct answer data indicating a location of a target object in a low-resolution image on the basis of the location of the target object that is specified by a user through the input section 311. The correct-answer-data generator 313 supplies the correct answer data to the training data generator 316.

Figure 7:
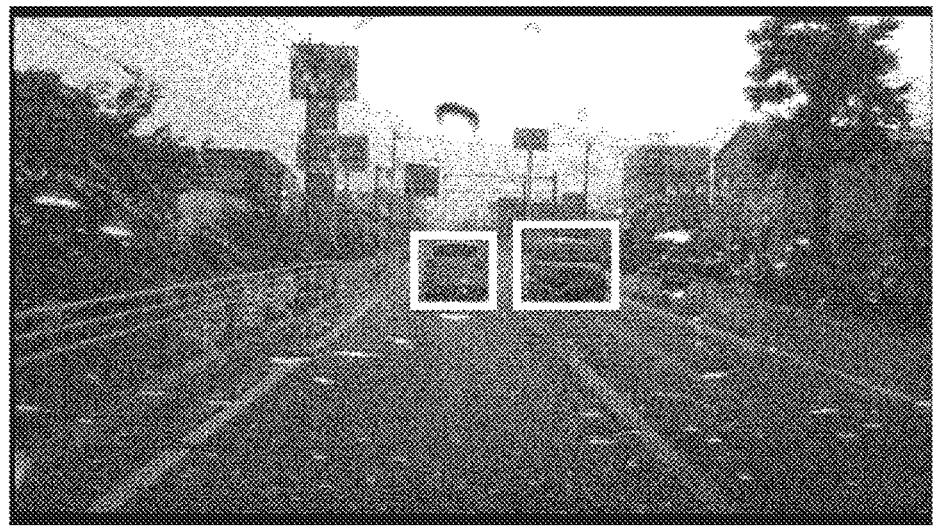
FIG. 7 illustrates an example of correct answer data.

FIG. 7 illustrates an example of correct answer data generated with respect to the low-resolution image of FIG. 6. A region boxed in white indicates a location of a vehicle that is the target object.

The signal processor 314 performs specified signal processing on millimeter-wave data to estimate a location and a speed of an object off which a transmission signal has been reflected in a region situated ahead of the vehicle 10. The location of the object is represented by, for example, a distance from the vehicle 10 to the object, and a direction (an angle) of the object with respect to an optical-axis direction of the millimeter-wave radar 202 (a traveling direction of the vehicle 10). Note that, for example, when a transmission signal is radially transmitted, the optical-axis direction of the millimeter-wave radar 202 is the same as a direction of the center of a range in which the radial transmission is performed, and when scanning is performed with the transmission signal, the optical-axis direction of the millimeter-wave radar 202 is the same as a direction of the center of a range in which the scanning is performed. The speed of the object is represented by, for example, a relative speed of the object with respect to the vehicle 10.

The signal processor 314 generates a signal-intensity image and a speed image on the basis of a result of estimating the location and the speed of the object. The signal processor 314 supplies the signal-intensity image and the speed image to the geometric transformation section 315.

Figure 8:
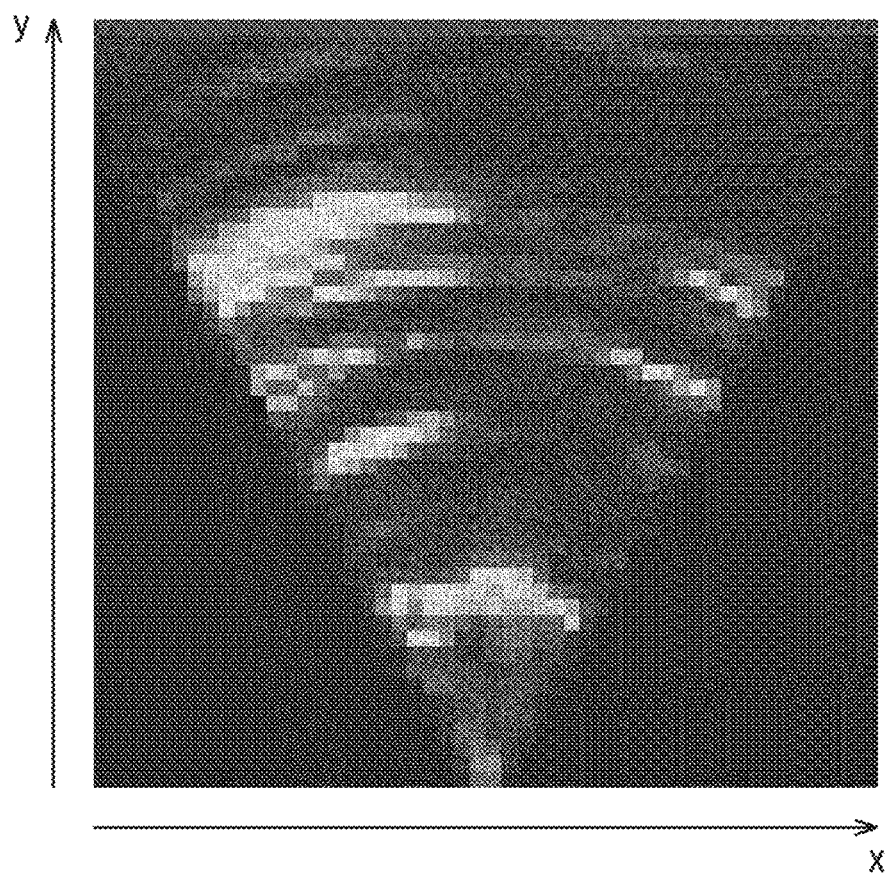
FIG. 8 illustrates an example of a millimeter-wave image.

FIG. 8 illustrates an example of a signal-intensity image. An x-axis of the signal-intensity image represents the lateral direction (the width direction of the vehicle 10), and a y-axis of the signal-intensity image represents the optical-axis direction of the millimeter-wave radar 202 (the traveling direction of the vehicle 10, the depth direction). In the signal-intensity image, a location of an object situated ahead of the vehicle 10, and a distribution of the reflection intensity of each object, that is, a distribution of the intensity of a reception signal reflected off the object situated ahead of the vehicle 10 are given with a bird's-eye view.

Note that the speed image is an image in which the location of the object situated ahead of the vehicle 10, and the distribution of the relative speed of the object are given with a bird's-eye view, as in the case of the signal-intensity image, although an illustration thereof is omitted.

The geometric transformation section 315 performs a geometric transformation on a signal-intensity image and a speed image, and transforms the signal-intensity image and the speed image into images of which a coordinate system is identical to the coordinate system of a captured image to generate a geometrically transformed signal-intensity image and a geometrically transformed speed image. The geometric transformation section 315 supplies the geometrically transformed signal-intensity image and the geometrically transformed speed image to the training data generator 316.

Figure 9:
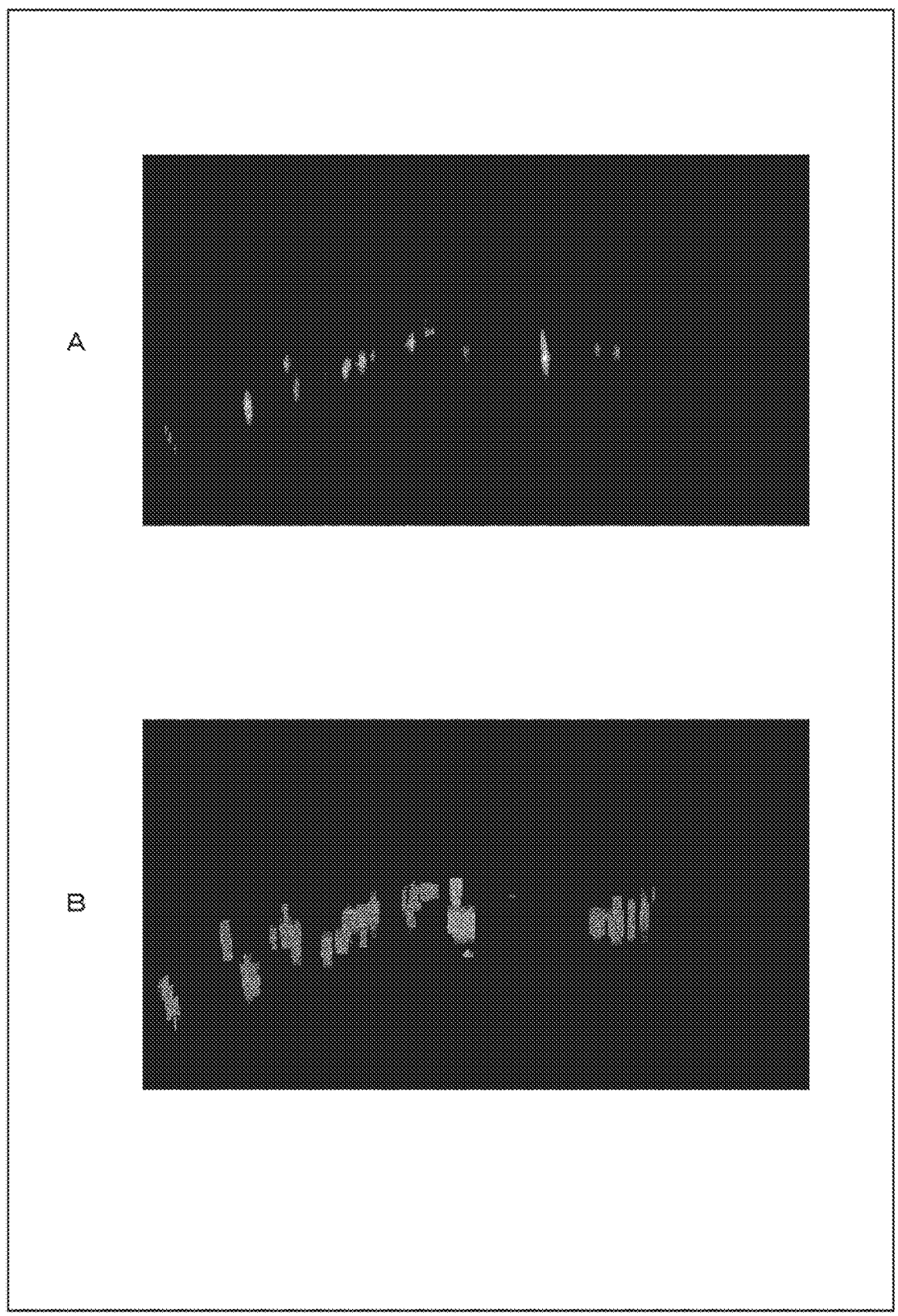
FIG. 9 illustrates examples of a geometrically transformed signal-intensity image and a geometrically transformed speed image.

FIG. 9 illustrates examples of a geometrically transformed signal-intensity image and a geometrically transformed speed image. A of FIG. 9 illustrates the example of a geometrically transformed signal-intensity image, and B of FIG. 9 illustrates the example of a geometrically transformed speed image. Note that the geometrically transformed signal-intensity image and the geometrically transformed speed image in FIG. 9 are generated on the basis of millimeter-wave data acquired at substantially the same time as a captured image from which the low-resolution image of FIG. 7 is generated.

In the geometrically transformed signal-intensity image, a portion with a higher signal intensity is brighter, and a portion with a lower signal intensity is darker. In the geometrically transformed speed image, a portion in which a higher relative speed is exhibited is brighter, a portion in which a lower relative speed is exhibited is darker, and a portion in which the relative speed is not detectable (there exists no object) is in solid black.

As described above, when a geometric transformation is performed on a millimeter-wave image (a signal-intensity image and a speed image), not only the location of an object in the lateral direction and the depth direction, but also the location of the object in the height direction is given.

However, with respect to the millimeter-wave radar 202, the resolution in the height direction becomes low as a distance is increased. Thus, the height of a distant object may be detected to be higher than its actual height.

On the other hand, the geometric transformation section 315 restricts the height of an object situated at a distance not less than a specified distance when the geometric transformation section 315 performs a geometric transformation on a millimeter-wave image. Specifically, when an object situated at a distance not less than a specified distance has a height exhibiting a value greater than a specified upper limit in the geometric transformation on a millimeter-wave image, the geometric transformation section 315 restricts the height of the object to the upper limit to perform the geometric transformation. This prevents false recognition performed due to the height of a distant vehicle being detected to be higher than its actual height when the target object is, for example, a vehicle.

The training data generator 316 generates training data that includes input data and correct answer data, the input data including a captured image, a geometrically transformed signal-intensity image, and a geometrically transformed speed image. The training data generator 316 supplies the generated training data to the learning section 317.

In Step S2, the learning section 317 causes the object recognition model 251 to perform learning. Specifically, the learning section 317 inputs the input data included in the training data to the object recognition model 251. The object recognition model 251 performs processing of recognizing a target object, and outputs data indicating a result of the recognition. The learning section 317 compares the result of the recognition performed by the object recognition model 251 with the correct answer data, and adjusts, for example, a parameter of the object recognition model 251 such that the error is reduced.

In Step S3, the learning section 317 determines whether the learning is to be continuously performed. For example, when the learning performed by the object recognition model 251 has not come to an end, the learning section 317 determines that the learning is to be continuously performed, and the process returns to Step S1.

Thereafter, the processes of Steps S1 to S3 are repeatedly performed until it is determined, in Step S3, that the learning is to be terminated.

On the other hand, the learning section 317 determines, in Step S3, that the learning performed by the object recognition model 251 is to be terminated when, for example, the learning has come to an end, and the learning processing performed on the object recognition model is terminated.

As described above, the object recognition model 251 that has performed learning is generated.

Figure 10:
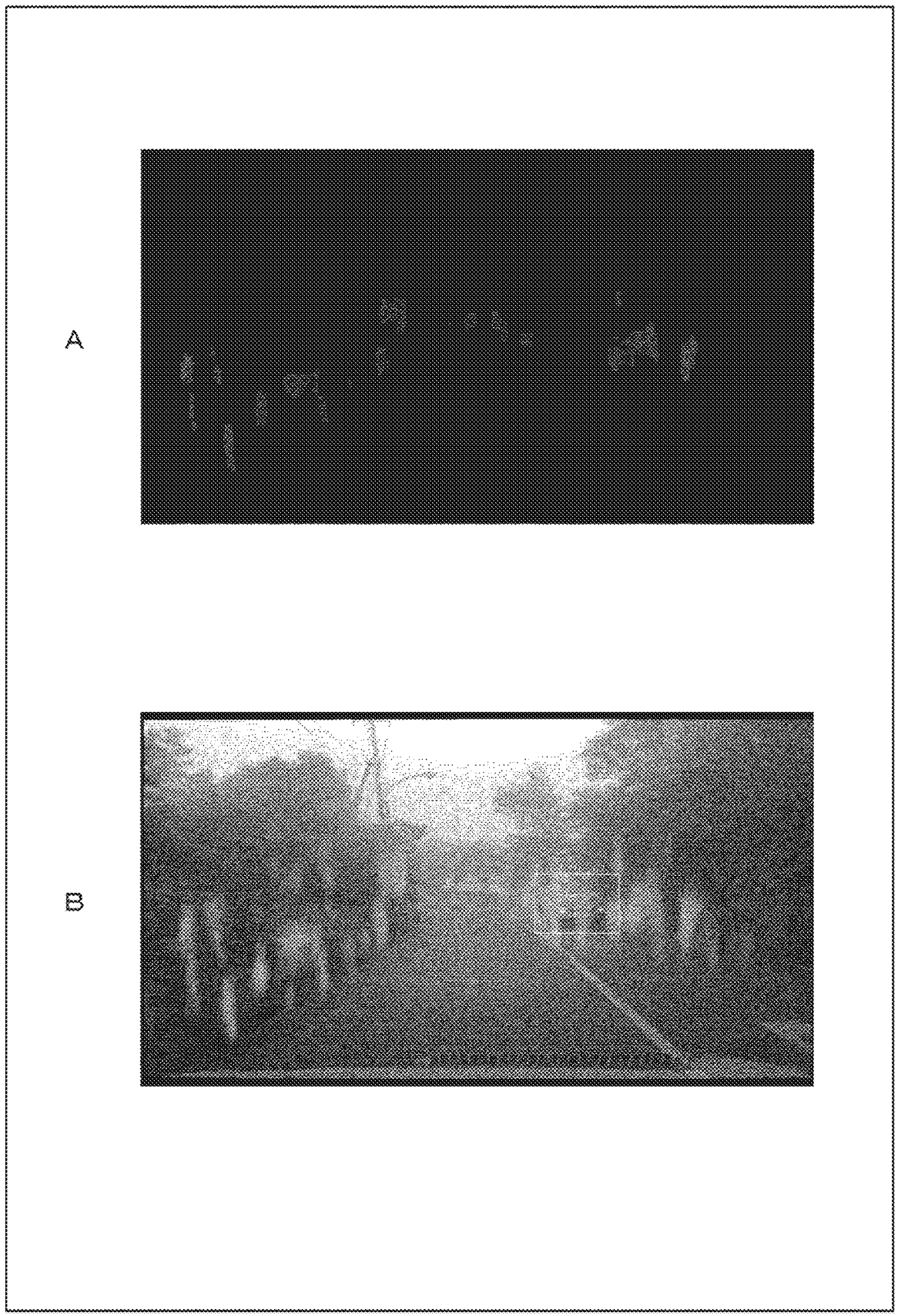
FIG. 10 illustrates an example of a result of object recognition processing performed only using millimeter-wave data.

Note that FIG. 10 illustrates an example of a result of recognition performed by the object recognition model 251 that has performed learning only using millimeter-wave data without using a captured image.

A of FIG. 10 illustrates an example of a geometrically transformed signal-intensity image generated on the basis of millimeter-wave data.

B of FIG. 10 illustrates an example of a result of recognition performed by the object recognition model 251. Specifically, the viewpoint-transformed intensity image of A of FIG. 10 is superimposed on a captured image that is acquired at substantially the same time as the millimeter-wave data from which the viewpoint-transformed intensity image of A of FIG. 10 is generated, and a boxed region indicates a location in which a vehicle of the target object is recognized.

As illustrated in this example, the object recognition model 251 also makes it possible to recognize a vehicle of the target object with a degree of accuracy not less than a specified degree of accuracy when only millimeter-wave data (a geometrically transformed signal-intensity image and a geometrically transformed speed image) is used.

<Target-Object Recognition Processing>

Next, target-object recognition processing performed by the vehicle 10 is described with reference to a flowchart of FIG. 11.

This processing is started when, for example, an operation for activating the vehicle 10 to start driving is performed, that is, when, for example, an ignition switch, a power switch, a start switch, or the like of the vehicle 10 is turned on. Further, this processing is terminated when, for example, an operation for terminating the driving of the vehicle 10 is performed, that is, when, for example, the ignition switch, the power switch, the start switch, or the like of the vehicle 10 is turned off.

In Step S101, the camera 201 and the millimeter-wave radar 202 perform sensing with respect to a region situated ahead of the vehicle 10.

Specifically, the camera 201 captures an image of a region situated ahead of the vehicle 10, and supplies the obtained captured image to the image processor 221.

The millimeter-wave radar 202 transmits a transmission signal in a forward direction of the vehicle 10, and receives, using a plurality of reception antennas, reception signals that are signals reflected off an object situated ahead of the vehicle 10. The millimeter-wave radar 202 supplies the signal processor 222 with millimeter-wave data that chronologically indicates the intensity of the reception signal received using each reception antenna.

In Step S102, the image processor 221 performs preprocessing on the captured image. Specifically, the image processor 221 performs, for example, processing of reduction in number with respect to the captured image to generate a low-resolution image, and supplies the low-resolution image to the object recognition section 224.

In Step S103, the signal processor 222 generates a millimeter-wave image. Specifically, the signal processor 222 performs processing similar to the processing performed by the signal processor 314 in Step S1 of FIG. 5 to generate a signal-intensity image and a speed image on the basis of the millimeter-wave data. The signal processor 222 supplies the signal-intensity image and the speed image to the geometric transformation section 223.

In Step S104, the geometric transformation section 223 performs a geometric transformation on the millimeter-wave image. Specifically, the geometric transformation section 223 performs processing similar to the processing performed by the geometric transformation section 315 in Step S1 of FIG. 5 to transform the signal-intensity image and the speed image into a geometrically transformed signal-intensity image and a geometrically transformed speed image. The geometric transformation section 223 supplies the geometrically transformed signal-intensity image and the geometrically transformed speed image to the object recognition section 224.

In Step S105, the object recognition section 224 performs processing of recognizing a target object on the basis of the low-resolution image, and the millimeter-wave image on which the geometric transformation has been performed. Specifically, the object recognition section 224 inputs, to the object recognition model 251, input data that includes the low-resolution image, the geometrically transformed signal-intensity image, and the geometrically transformed speed image. The object recognition model 251 performs processing of recognizing a target object situated ahead of the vehicle 10 on the basis of the input data.

Figure 12:
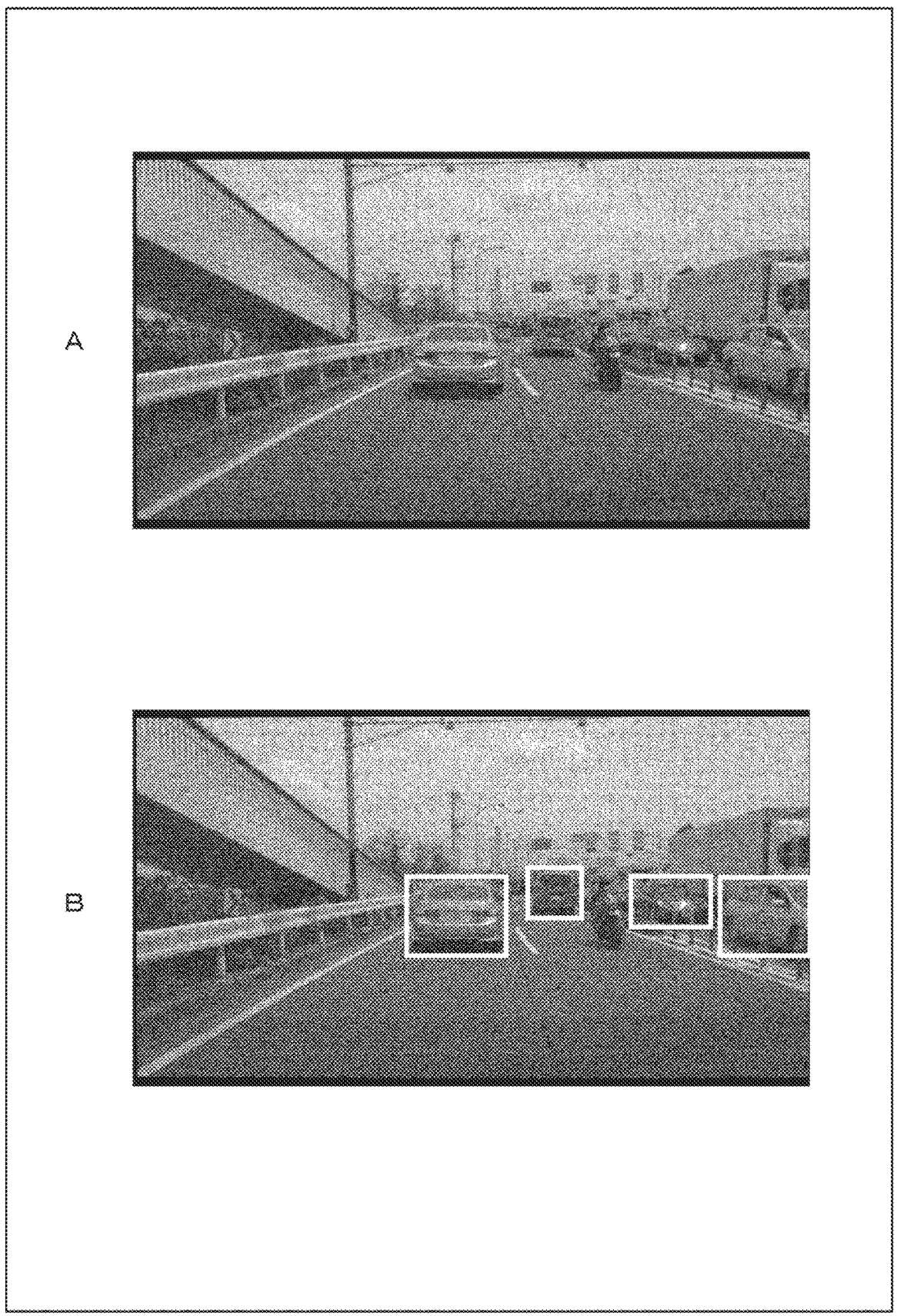
FIG. 12 illustrates an example of a result of recognizing a target object.

FIG. 12 illustrates an example of a recognition result when the target object is a vehicle. A of FIG. 12 illustrates an example of a captured image. B of FIG. 12 illustrates an example of a result of recognizing a vehicle. In B of FIG. 12, a region in which the vehicle is recognized is boxed.

The object recognition section 224 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135.

On the basis of, for example, the result of recognizing the target object, the self-location estimator 132 performs a process of estimating a location, a posture, and the like of the vehicle 10.

On the basis of, for example, the result of recognizing the target object, the map analyzer 151 performs a process of analyzing various maps stored in the storage 111, and constructs a map including information necessary for an automated driving process.

On the basis of, for example, the result of recognizing the target object, the traffic-rule recognition section 152 performs a process of recognizing traffic rules around the vehicle 10.

On the basis of, for example, the result of recognizing the target object, the state recognition section 153 performs a process of recognizing a state of the surroundings of the vehicle 10.

When the emergency event avoiding section 171 detects the occurrence of an emergency event on the basis of, for example, the result of recognizing the target object, the emergency event avoiding section 171 plans movement of the vehicle 10 such as a sudden stop or a quick turning for avoiding the emergency event.

Thereafter, the process returns to Step S101, and the processes of and after Step S101 are performed.

The accuracy in recognizing a target object situated ahead of the vehicle 10 can be improved as described above.

Specifically, when the processing of recognizing a target object is performed only using a captured image, the accuracy in recognizing a target object is reduced due to bad weather (such as rain or fog), at night, or in poor visual conditions due to, for example, an obstacle. On the other hand, when millimeter-wave radar is used, the accuracy in recognizing a target object is hardly reduced due to bad weather, at night, or in poor visual conditions due to, for example, an obstacle. Thus, the camera 201 and the millimeter-wave radar 202 (a captured image and millimeter-wave data) are fused to perform processing of recognizing a target object, and this makes it possible to compensate for a drawback caused when only a captured image is used. This results in improving the accuracy in recognition.

Figure 13:
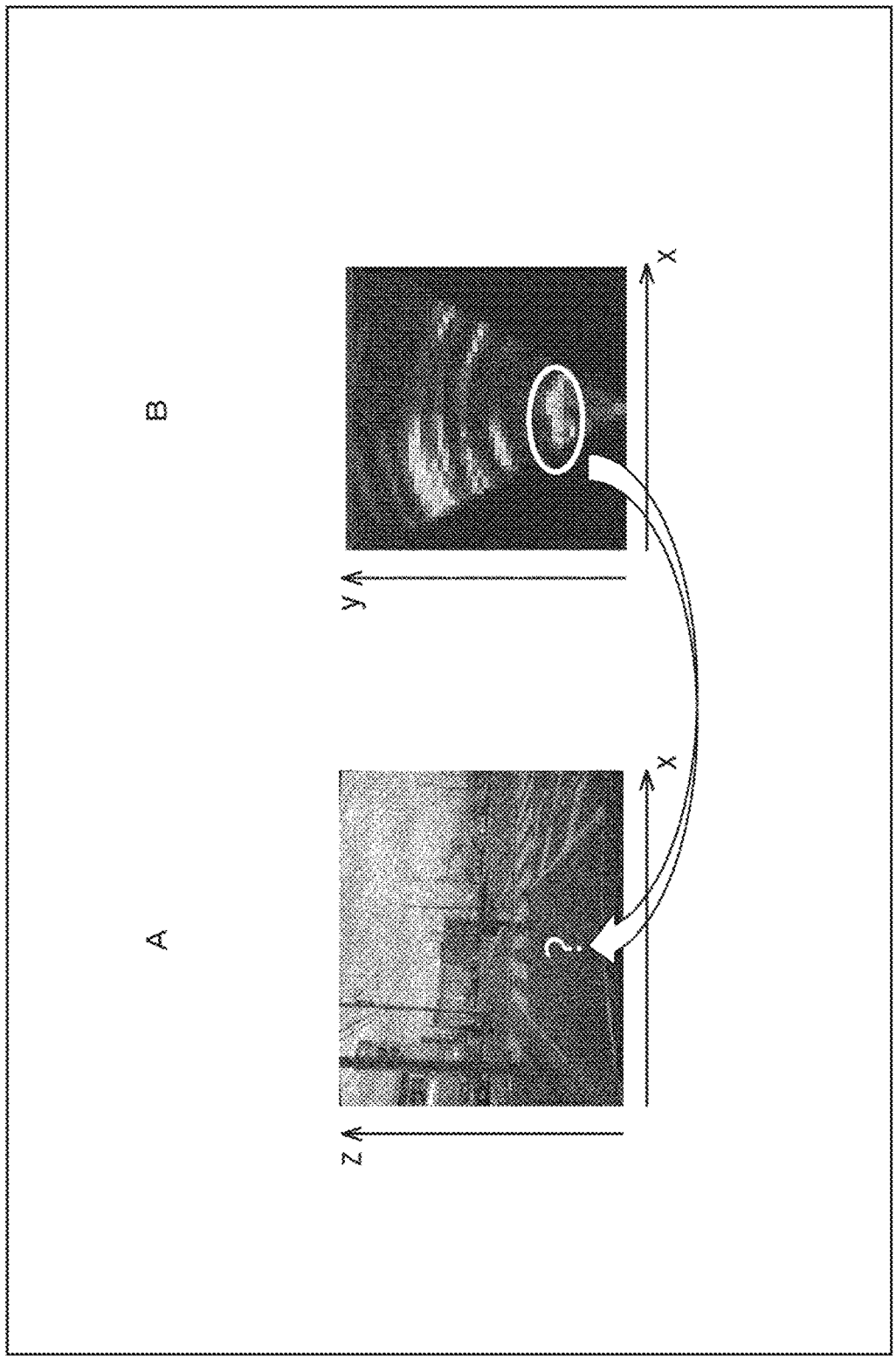
FIG. 13 is a diagram for describing effects provided by the present technology.

Further, as illustrated in A of FIG. 13, a captured image is represented by a coordinate system defined by an x-axis and a z-axis. The x-axis represents the lateral direction (the width direction of the vehicle 10), and the z-axis represents the height direction. On the other hand, as illustrated in B of FIG. 13, the millimeter-wave image is represented by a coordinate system defined by an x-axis and a y-axis. The x-axis is similar to the x-axis of the coordinate system of the captured image. Note that the x-axis extends in line with a direction in which a transmission signal of the millimeter-wave radar 202 is spread out in a planar manner. The y-axis represents the optical-axis direction of the millimeter-wave radar 202 (the traveling direction of the vehicle 10, the depth direction).

When there is a difference in coordinate system between a captured image and a millimeter-wave image, as described above, this results in being difficult to understand a correlation between the captured image and the millimeter-wave image. For example, it is difficult to match each pixel of a captured image with a reflection point in a millimeter-wave image (a point at which the intensity of a reception signal is high). Thus, when the object recognition model 251 is caused to perform learning by deep learning using the captured image and the millimeter-wave image of A of FIG. 13, the difficulty in learning will be increased, and this may result in a reduction in the accuracy in learning.

On the other hand, according to the present technology, a geometric transformation is performed on a millimeter-wave image (a signal-intensity image and a speed image) to obtain an image (a geometrically transformed signal-intensity image and a geometrically transformed speed image) of which a coordinate system has been matched to the coordinate system of a captured image, and the object recognition model 251 is caused to perform learning using the obtained image. This results in facilitating matching of each pixel of the captured image with a reflection point in the millimeter-wave image, and in improving the accuracy in learning. Further, in actual processing of recognizing a vehicle, the use of a geometrically transformed signal-intensity image and a geometrically transformed speed image results in improving the accuracy in recognizing a target object.

2. Second Embodiment

Next, a second embodiment of the present technology is described with reference to FIGS. 14 to 16.

<Example of Configuration of Vehicle-Exterior-Information Detector 141B>

Figure 14:
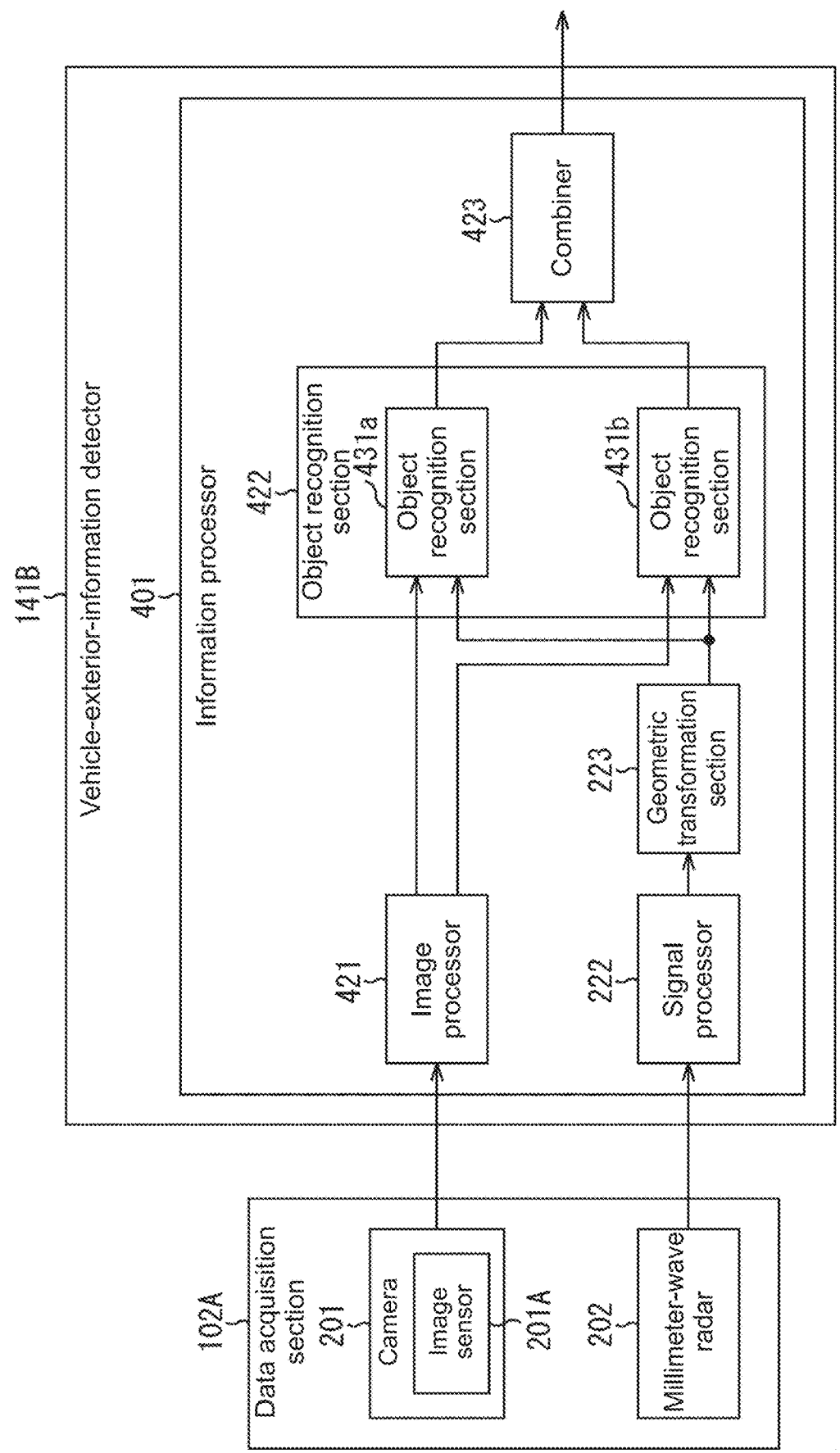
FIG. 14 is a block diagram illustrating a second embodiment of the vehicle-exterior-information detector.
Figure 15:
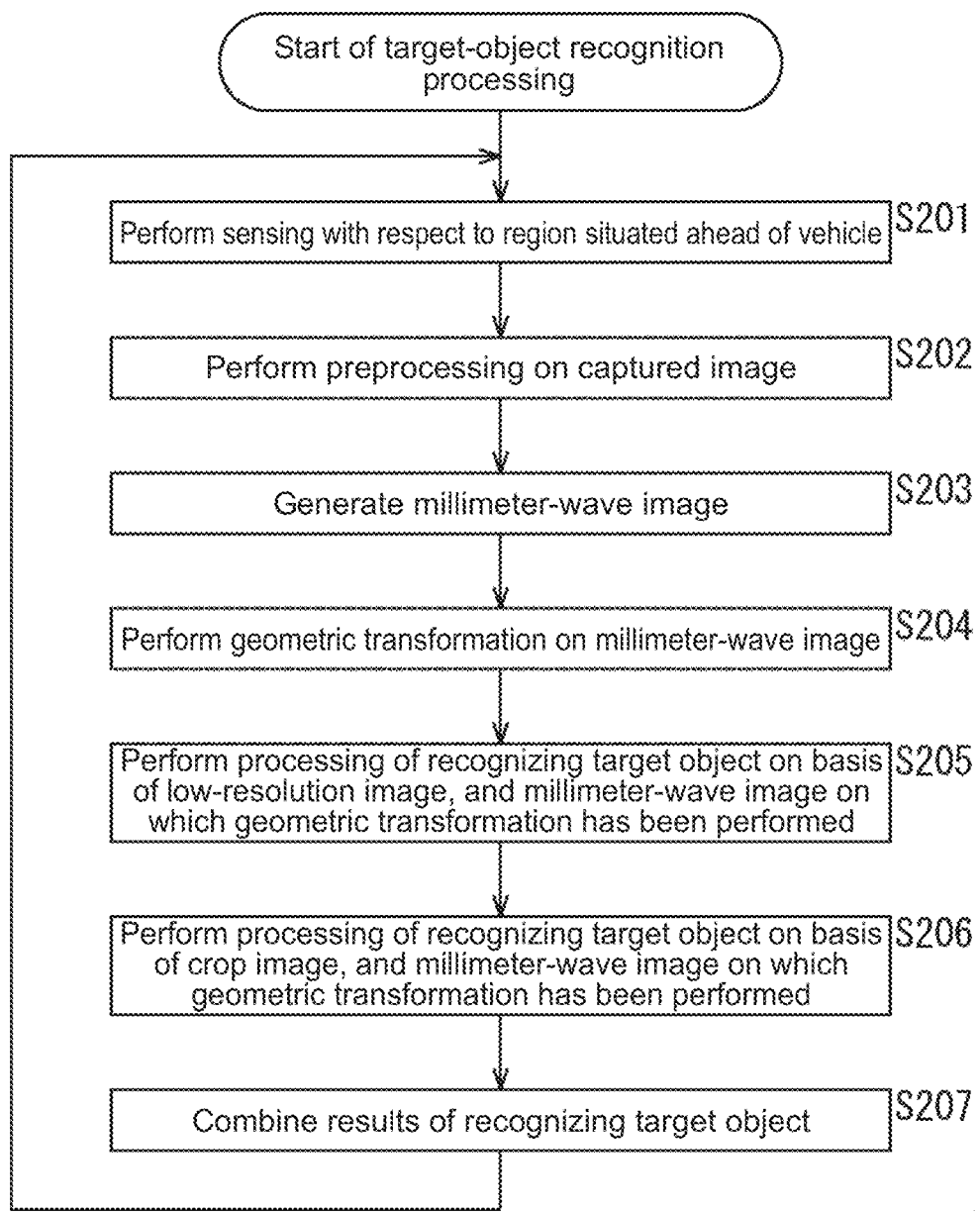
FIG. 15 is a flowchart for describing a second embodiment of the target-object recognition processing.

FIG. 14 illustrates an example of a configuration of a vehicle-exterior-information detector 141B that is a second embodiment of the vehicle-exterior-information detector 141 of the vehicle control system 100 of FIG. 1. Note that a portion in the figure that corresponds to a portion in FIG. 2 is denoted by the same reference numeral as FIG. 2, and a description thereof is omitted as appropriate.

The vehicle-exterior-information detector 141B includes an information processor 401. The information processor 401 is similar to the information processor 211 of FIG. 2 in including the signal processor 222 and the geometric transformation section 223. On the other hand, the information processor 401 is different from the information processor 211 in including an image processor 421 and an object recognition section 422 instead of the image processor 221 and the object recognition section 224, and in that a combiner 423 is added. The object recognition section 422 includes an object recognition section 431a and an object recognition section 431b.

As in the case of the image processor 221, the image processor 421 generates a low-resolution image on the basis of a captured image. The image processor 421 supplies the low-resolution image to the object recognition section 431a.

Further, the image processor 421 cuts out a portion of the captured image according to the image size for which the object recognition section 431b can perform processing. The image processor 421 supplies the image cut out of the captured image (hereinafter referred to as a crop image) to the object recognition section 431b.

As in the case of the object recognition section 224 of FIG. 2, the object recognition model 251 of FIG. 3 is used for the object recognition section 431a and the object recognition section 431b.

As in the case of the object recognition section 224 of FIG. 2, the object recognition section 431a performs processing of recognizing a target object situated ahead of the vehicle 10 on the basis of the low-resolution image, a geometrically transformed signal-intensity image, and a geometrically transformed speed image. The object recognition section 431a supplies the combiner 423 with data indicating a result of the processing of recognizing the target object.

The object recognition section 431b performs processing of recognizing the target object situated ahead of the vehicle 10 on the basis of the crop image, the geometrically transformed signal-intensity image, and the geometrically transformed speed image. The object recognition section 431b supplies the combiner 423 with data indicating a result of the processing of recognizing the target object.

Note that learning processing is performed with respect to each of the object recognition model 251 used for the object recognition section 431a and the object recognition model 251 used for the object recognition section 431b using different training data, although a detailed description thereof is omitted. Specifically, the object recognition model 251 used for the object recognition section 431a is caused to perform learning using training data that includes input data and correct answer data, the input data including the low-resolution image, the geometrically transformed signal-intensity image, and the geometrically transformed speed image, the correct answer data being generated on the basis of the low-resolution image. On the other hand, the object recognition model 251 used for the object recognition section 431b is caused to perform learning using training data that includes input data and correct answer data, the input data including the crop image, the geometrically transformed signal-intensity image, and the geometrically transformed speed image, the correct answer data being generated on the basis of the crop image.

The combiner 423 combines the result of recognition of the target object that is performed by the object recognition section 431a, and the result of recognition of the target object that is performed by the object recognition section 431b. The combiner 423 supplies data indicating a result of recognizing the target object that is obtained by the combining to, for example, the self-location estimator 132; the map analyzer 151, the traffic-rule recognition section 152, and the state recognition section 153 of the state analyzer 133; and the emergency event avoiding section 171 of the movement controller 135.

<Target-Object Recognition Processing>

Next, a second embodiment of the target-object recognition processing is described with reference to a flowchart of FIG. 15.

This processing is started when, for example, an operation for activating the vehicle 10 to start driving is performed, that is, when, for example, an ignition switch, a power switch, a start switch, or the like of the vehicle 10 is turned on. Further, this processing is terminated when, for example, an operation for terminating the driving of the vehicle 10 is performed, that is, when, for example, the ignition switch, the power switch, the start switch, or the like of the vehicle 10 is turned off.

Figure 11:
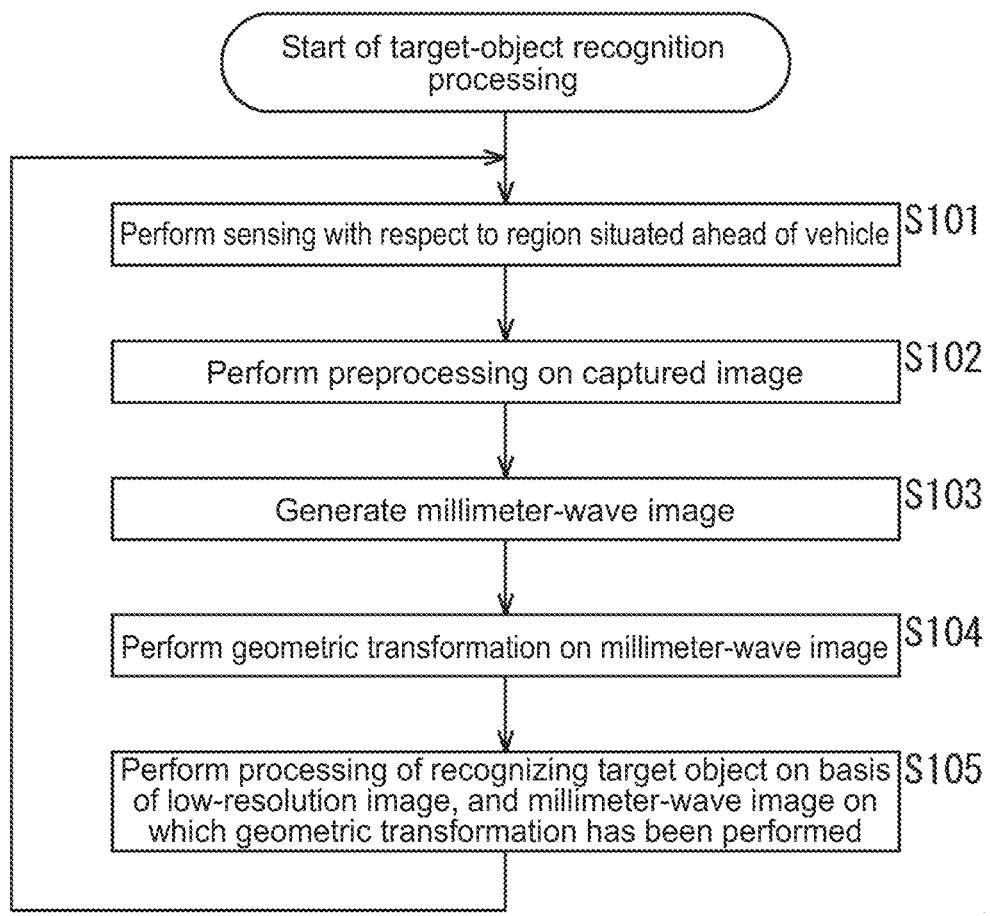
FIG. 11 is a flowchart for describing a first embodiment of target-object recognition processing.

In Step S201, sensing is performed on a region situated ahead of the vehicle 10, as in the process of Step S101 of FIG. 11.

In Step S202, the image processor 421 performs preprocessing on a captured image. Specifically, the image processor 421 performs processing similar to the processing performed in Step S102 of FIG. 11 to generate a low-resolution image on the basis of the captured image. The image processor 421 supplies the low-resolution image to the object recognition section 431a.

Further, the image processor 421 detects, for example, a vanishing point of a road in the captured image. From the captured image, the image processor 421 cuts out an image in a rectangular region that has a specified size and is centered at the vanishing point. The image processor 421 supplies a crop image obtained by the cutout to the object recognition section 431b.

Figure 16:
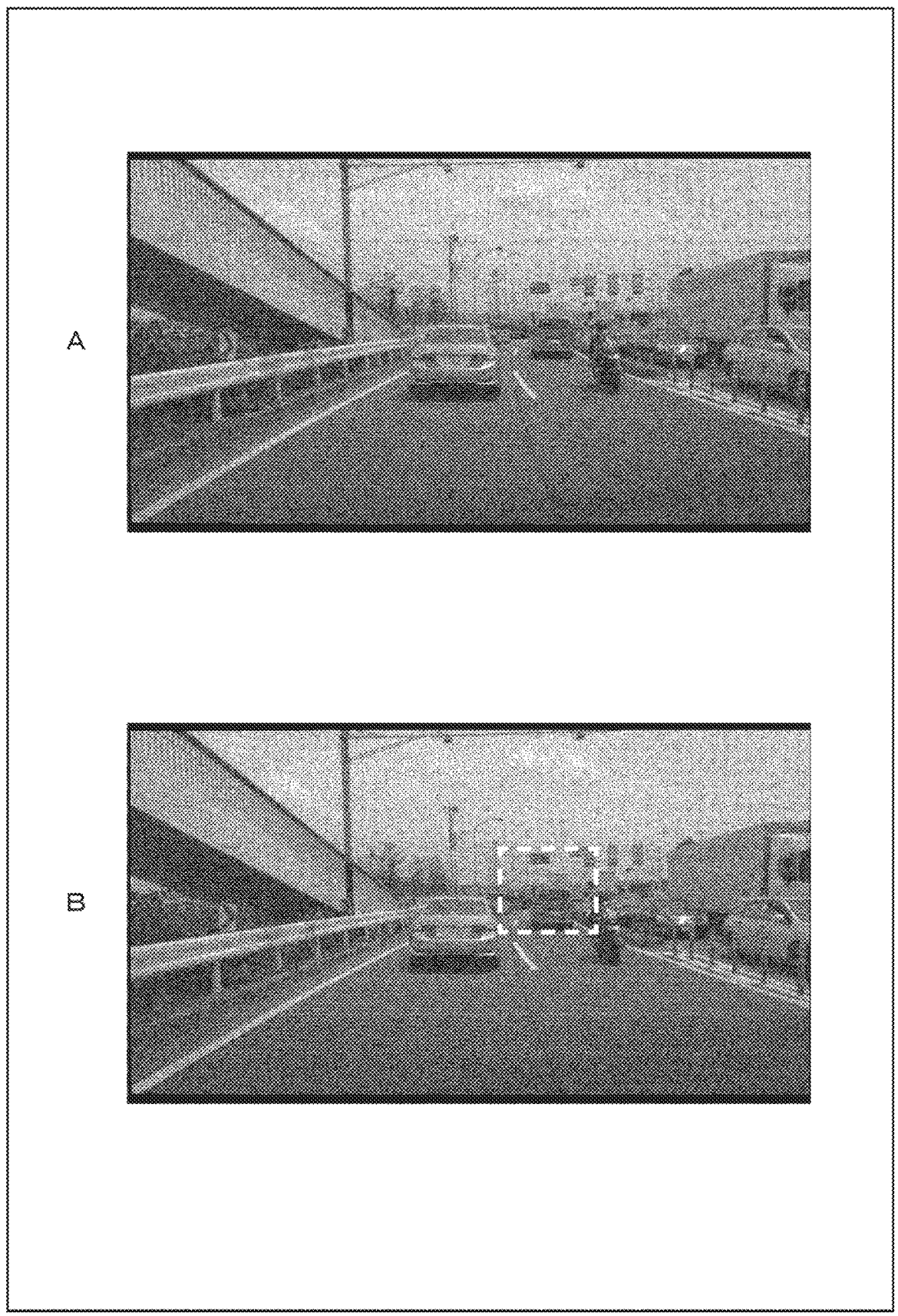
FIG. 16 illustrates an example of a relationship between a captured image and a crop image.

FIG. 16 illustrates an example of a relationship between a captured image and a crop image. Specifically, A of FIG. 16 illustrates an example of a captured image. Further, a rectangular region, in the captured image, that is boxed with a dotted line in B of FIG. 16 is cut out as a crop image, the rectangular region having a specified size and being centered at a vanishing point of a road.

In Step S203, a millimeter-wave image, that is, a signal-intensity image and a speed image, is generated, as in the process of Step S103 of FIG. 11.

In Step S204, a geometric transformation is performed on the millimeter-wave images, as in the process of Step S104 of FIG. 11. This results in generating a geometrically transformed signal-intensity image and a geometrically transformed speed image. The geometric transformation section 223 supplies the geometrically transformed signal-intensity image and the geometrically transformed speed image to the object recognition section 431a and the object recognition section 431b.

In Step S205, the object recognition section 431a performs processing of recognizing a target object on the basis of a low-resolution image, and the millimeter-wave image on which the geometric transformation has been performed. Specifically, the object recognition section 431a performs processing similar to the processing performed in Step S105 of FIG. 11 to perform processing of recognizing a target object situated ahead of the vehicle 10 on the basis of the low-resolution image, the geometrically transformed signal-intensity image, and the geometrically transformed speed image. The object recognition section 431a supplies the combiner 423 with data indicating a result of the processing of recognizing the target object.

In Step S206, the object recognition section 431b performs processing of recognizing a vehicle on the basis of the crop image, and the millimeter-wave image on which the geometric transformation has been performed. Specifically, the object recognition section 224 inputs, to the object recognition model 251, input data that includes the crop image, the geometrically transformed signal-intensity image, and the geometrically transformed speed image. The object recognition model 251 performs processing of recognizing the target object situated ahead of the vehicle 10 on the basis of the input data. The object recognition section 431b supplies the combiner 423 with data indicating a result of recognizing the target object.

In Step S207, the combiner 423 combines the results of recognizing the target object. Specifically, the combiner 423 combines the result of the recognition of the target object that is performed by the object recognition section 431a and the result of the recognition of the target object that is performed by the object recognition section 431b. The combiner 423 supplies data indicating a result of recognizing the target object that is obtained by the combining to, for example, the self-location estimator 132; the map analyzer 151, the traffic-rule recognition section 152, and the state recognition section 153 of the state analyzer 133; and the emergency event avoiding section 171 of the movement controller 135.

On the basis of, for example, the result of recognizing the target object, the self-location estimator 132 performs a process of estimating a location, a posture, and the like of the vehicle 10.

On the basis of, for example, the result of recognizing the target object, the map analyzer 151 performs a process of analyzing various maps stored in the storage 111, and constructs a map including information necessary for an automated driving process.

On the basis of, for example, the result of recognizing the target object, the traffic-rule recognition section 152 performs a process of recognizing traffic rules around the vehicle 10.

On the basis of, for example, the result of recognizing the target object, the state recognition section 153 performs a process of recognizing a state of the surroundings of the vehicle 10.

When the emergency event avoiding section 171 detects the occurrence of an emergency event on the basis of, for example, the result of recognizing the target object, the emergency event avoiding section 171 plans movement of the vehicle 10 such as a sudden stop or a quick turning for avoiding the emergency event.

Thereafter, the process returns to Step S201, and the processes of and after Step S201 are performed.

The accuracy in recognizing a target object situated ahead of the vehicle 10 can be improved as described above. Specifically, the use of a low-resolution image instead of a captured image results in a reduction in the accuracy in recognizing a distant target object in particular. However, when the processing of recognizing a target object is performed using a high-resolution crop image obtained by cutting out an image of a region around a vanishing point of a road, this makes it possible to improve the accuracy in recognizing a distant vehicle situated around the vanishing point in the case in which the target object is a vehicle.

3. Third Embodiment

Next, a third embodiment of the present technology is described with reference to FIG. 17.

<Examples of Configurations of Data Acquisition Section 102B and Vehicle-Exterior-Information Detector 141C>

Figure 17:
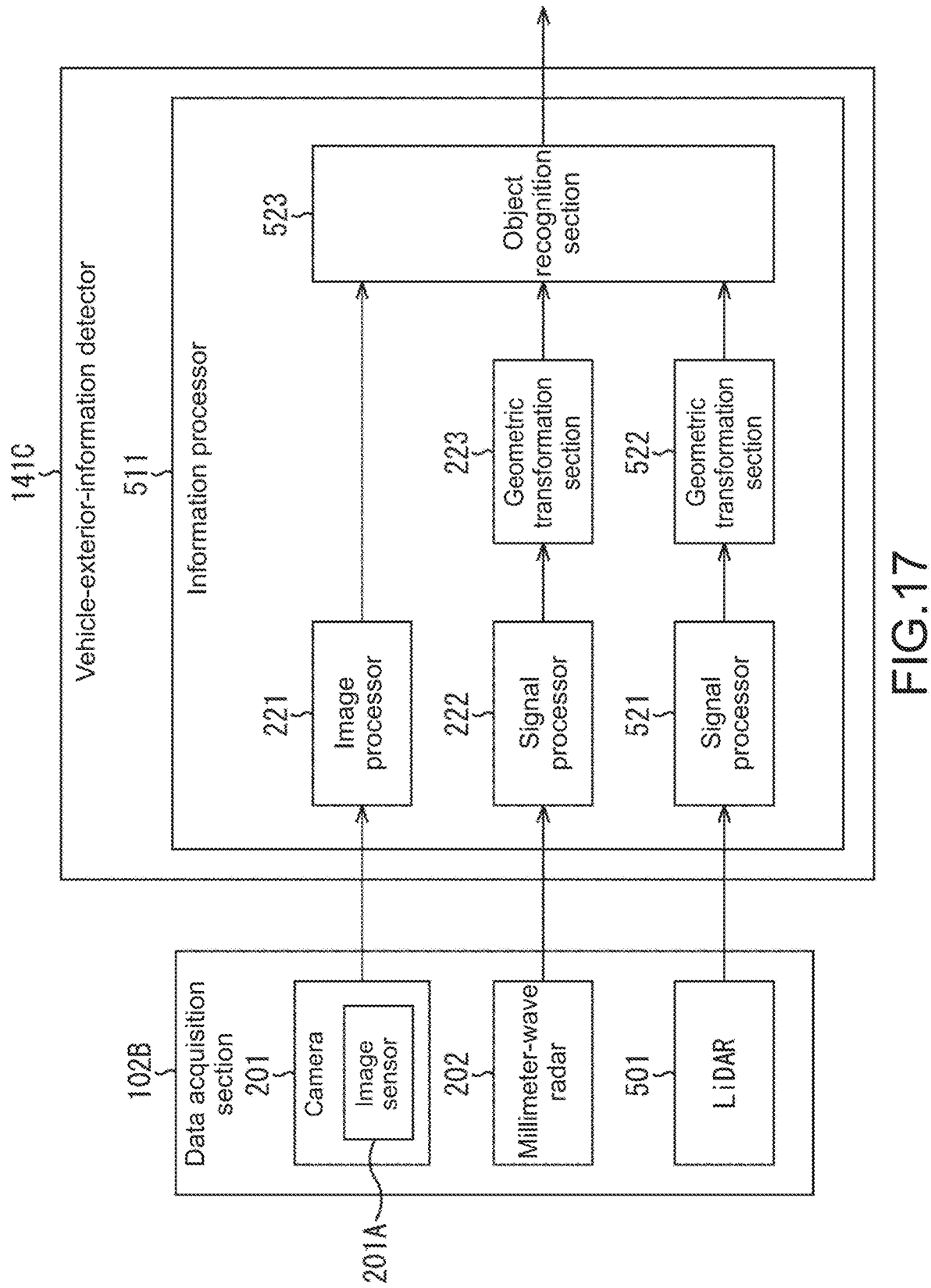
FIG. 17 is a block diagram illustrating a second embodiment of the data acquisition section and a third embodiment of the vehicle-exterior-information detector.

FIG. 17 illustrates examples of configurations of a data acquisition section 102B that is a second embodiment of the data acquisition section 102 in the vehicle control system 100 of FIG. 1, and a vehicle-exterior-information detector 141C that is a third embodiment of the vehicle-exterior-information detector 141 in the vehicle control system 100 of FIG. 1. Note that a portion in the figure that corresponds to a portion in FIG. 2 is denoted by the same reference numeral as FIG. 2, and a description thereof is omitted as appropriate.

The data acquisition section 102B is similar to the data acquisition section 102A of FIG. 2 in including the camera 201 and the millimeter-wave radar 202, and is different from the data acquisition section 102A of FIG. 2 in including LiDAR 501.

The vehicle-exterior-information detector 141C includes an information processor 511. The information processor 511 is similar to the information processor 211 of FIG. 2 in including the image processor 221, the signal processor 222, and the geometric transformation section 223. On the other hand, the information processor 511 is different from the information processor 211 in including an object recognition section 523 instead of the object recognition section 224, and in that a signal processor 521 and a geometric transformation section 522 are added.

The LiDAR 501 performs sensing with respect to a region situated ahead of the vehicle 10, and sensing ranges of the LiDAR 501 and the camera 201 at least partially overlap. For example, the LiDAR 501 performs scanning with a laser pulse in the lateral direction and in the height direction with respect to the region situated ahead of the vehicle 10, and receives reflected light that is a reflection of the laser pulse. The LiDAR 501 calculates a distance to an object situated ahead of the vehicle 10 on the basis of the time taken to receive the reflected light, and on the basis of a result of the calculation, the LiDAR 501 generates three-dimensional group-of-points data (point cloud) that indicates a shape and a location of the object situated ahead of the vehicle 10. The LiDAR 501 supplies the group-of-points data to the signal processor 521.

The signal processor 521 performs specified signal processing (for example, interpolation processing or processing of reduction in number) with respect to the group-of-points data, and supplies the geometric transformation section 522 with the group-of-points data on which the signal processing has been performed.

The geometric transformation section 522 performs a geometric transformation on the group-of-points data to generate a two-dimensional image (hereinafter referred to as two-dimensional group-of-points data) of which a coordinate system is identical to the coordinate system of a captured image. The geometric transformation section 522 supplies the two-dimensional group-of-points data to the object recognition section 523.

The object recognition section 523 performs processing of recognizing a target object situated ahead of the vehicle 10 on the basis of a low-resolution image, a geometrically transformed signal-intensity image, a geometrically transformed speed image, and the two-dimensional group-of-points data. The object recognition section 523 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135. The data indicating a result of recognizing a target object includes, for example, the location and the speed of a target object in a three-dimensional space, in addition to the location and the size of the target object in a captured image, and the type of object.

Note that an object recognition model having a configuration similar to the configuration of, for example, the object recognition model 251 of FIG. 3 is used for the object recognition section 523, although a detailed description thereof is omitted. However, one VGG16 is added for two-dimensional group-of-points data. Then, the object recognition model for the object recognition section 523 is caused to perform learning using training data that includes input data and correct answer data, the input data including a low-resolution image, a geometrically transformed signal-intensity image, a geometrically transformed speed image, and two-dimensional group-of-points data, the correct answer data being generated on the basis of the low-resolution image.

As described above, the addition of the LIDAR 501 results in further improving the accuracy in recognizing a target object.

4. Fourth Embodiment

Next, a fourth embodiment of the present technology is described with reference to FIG. 18.
<Example of Configuration of Vehicle-Exterior-Information Detector 141D>

Figure 18:
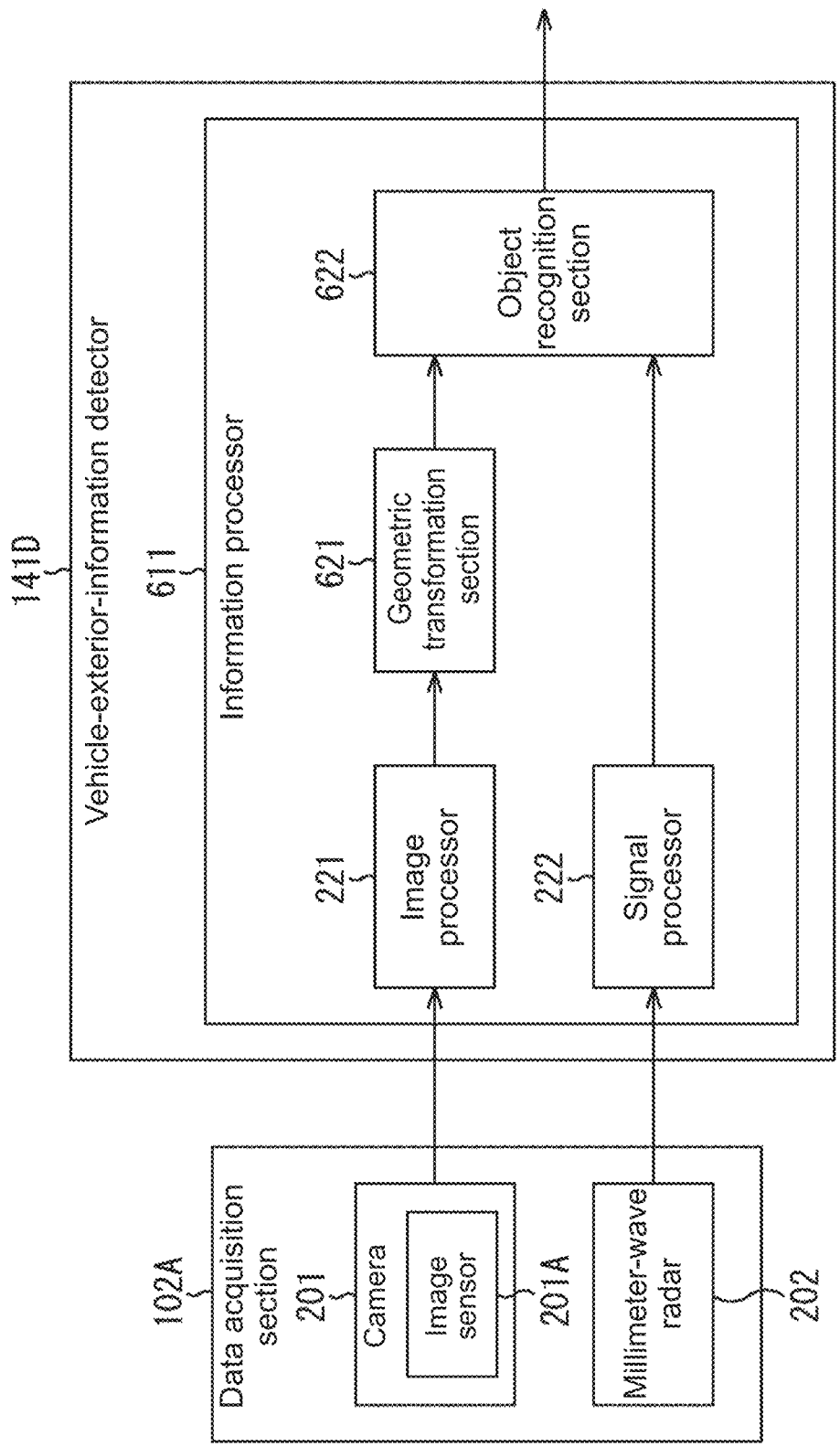
FIG. 18 is a block diagram illustrating a fourth embodiment of the vehicle-exterior-information detector.

FIG. 18 illustrates an example of a configuration of a vehicle-exterior-information detector 141D that is a fourth embodiment of the vehicle-exterior-information detector 141 in the vehicle control system 100 of FIG. 2. Note that a portion in the figure that corresponds to a portion in FIG. 2 is denoted by the same reference numeral as FIG. 2, and a description thereof is omitted as appropriate.

The vehicle-exterior-information detector 141D includes an information processor 611. The information processor 611 is similar to the information processor 211 of FIG. 2 in including the image processor 221 and the signal processor 222. On the other hand, the information processor 611 is different from the information processor 211 in including an object recognition section 622 instead of the object recognition section 224, and in that a geometric transformation section 621 is added and the geometric transformation section 223 has been removed.

The geometric transformation section 621 performs a geometric transformation on a low-resolution image supplied by the image processor 221 to transform the low-resolution image into an image (hereinafter referred to as a geometrically transformed low-resolution image) of which a coordinate system is identical to the coordinate system of a millimeter-wave image output by the signal processor 222. For example, the geometric transformation section 621 transforms the low-resolution image into an image of a bird's-eye view. The geometric transformation section 621 supplies the geometrically transformed low-resolution image to the object recognition section 622.

The object recognition section 622 performs processing of recognizing a target object situated ahead of the vehicle 10 on the basis of the geometrically transformed low-resolution image, and a signal-intensity image and a speed image that are supplied by the signal processor 222. The object recognition section 622 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135.

As described above, a captured image may be transformed into an image of which a coordinate system is identical to the coordinate system of the millimeter-wave image to perform the processing of recognizing an object.

5. Fifth Embodiment

Next, a fifth embodiment of the present technology is described with reference to FIG. 19.
Example of Configuration example of Vehicle-Exterior-Information Detector 141E>

Figure 19:
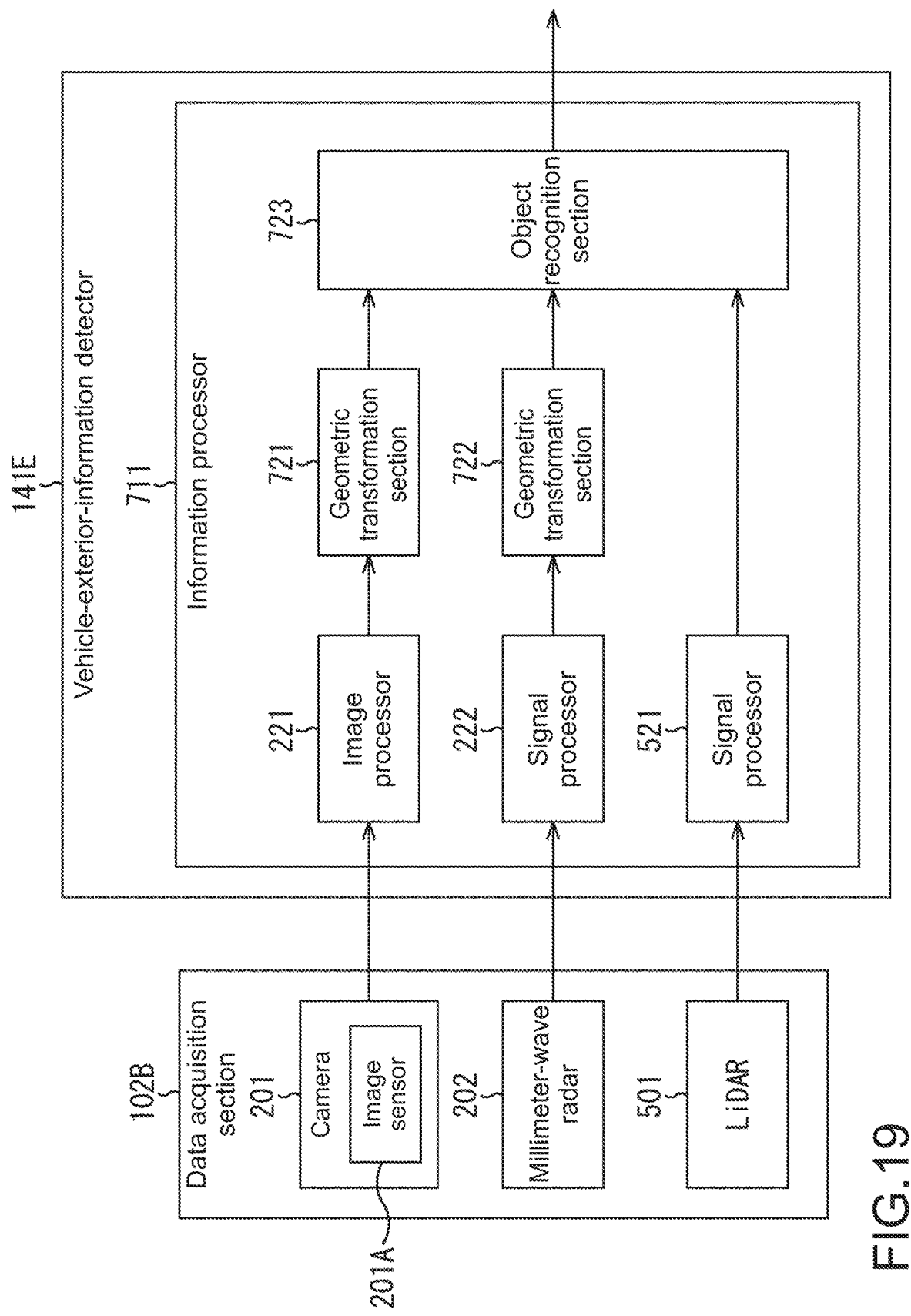
FIG. 19 is a block diagram illustrating a fifth embodiment of the vehicle-exterior-information detector.

FIG. 19 illustrates an example of a configuration of a vehicle-exterior-information detector 141E that is a fifth embodiment of the vehicle-exterior-information detector 141 in the vehicle control system 100 of FIG. 2. Note that a portion in the figure that corresponds to a portion in FIG. 17 is denoted by the same reference numeral as FIG. 17, and a description thereof is omitted as appropriate.

The vehicle-exterior-information detector 141E includes an information processor 711. The information processor 711 is similar to the information processor 511 of FIG. 17 in including the image processor 221, the signal processor 222, and the signal processor 521. On the other hand, the information processor 711 is different from the information processor 511 in including a geometric transformation section 722 and an object recognition section 723 instead of the geometric transformation section 223 and the object recognition section 523, and in that a geometric transformation section 721 is added and the geometric transformation section 522 has been removed.

The geometric transformation section 721 performs a geometric transformation on a low-resolution image supplied by the image processor 221 to transform the low-resolution image into three-dimensional group-of-points data (hereinafter referred to as image data of group of points) of which a coordinate system is identical to the coordinate system of group-of-points data output by the signal processor 521. The geometric transformation section 721 supplies the image data of group of points to the object recognition section 723.

The geometric transformation section 722 performs a geometric transformation on a signal-intensity image and a speed image that are supplied by the signal processor 222 to transform the signal-intensity image and the speed image into pieces of three-dimensional group-of-points data (hereinafter referred to as signal-intensity data of group of points and speed data of group of points) of which a coordinate system is identical to the coordinate system of the groupof-points data output by the signal processor 521. The geometric transformation section 722 supplies the signal-intensity data of group of points and the speed data of group of points to the object recognition section 723.

The object recognition section 723 performs processing of recognizing a target object situated ahead of the vehicle 10 on the basis of the image data of group of points, the signal-intensity data of group of points, the speed data of group of points, and group-of-points data that is generated by sensing performed by the LiDAR 501 and supplied by the signal processor 521. The object recognition section 723 supplies data indicating a result of recognizing the target object to, for example, the self-location estimator 132; the map analyzer 151, the traffic-rule recognition section 152, and the state recognition section 153 of the state analyzer 133; and the emergency event avoiding section 171 of the movement controller 135.

As described above, a captured image and a millimeter-wave image may be transformed into pieces of group-of-points data to perform the processing of recognizing an object.

6. Sixth Embodiment

Next, a sixth embodiment of the present technology is described with reference to FIG. 20.

<Examples of Configurations of Data Acquisition Section 102C and Vehicle-Exterior-Information Detector 141F>

Figure 20:
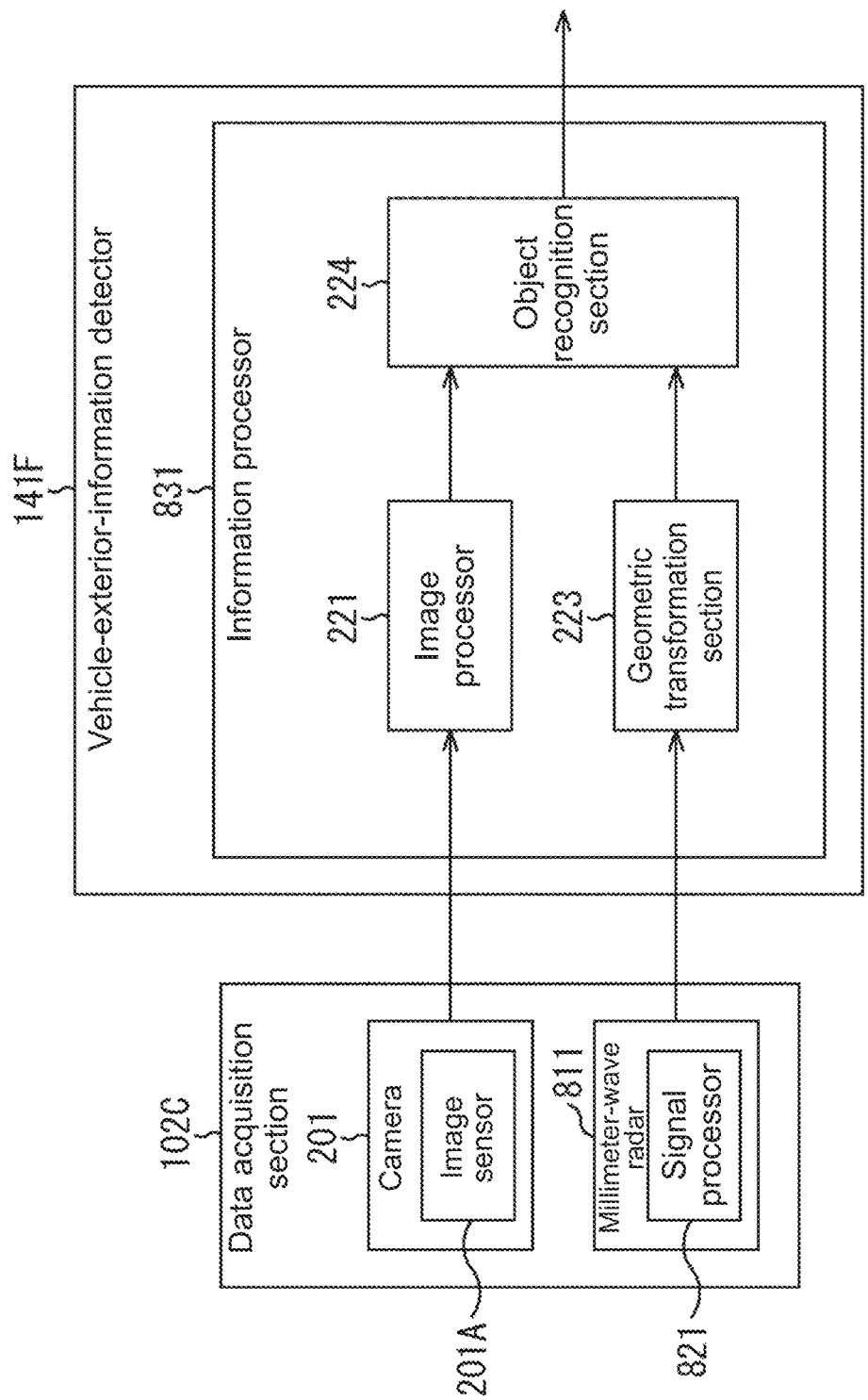
FIG. 20 is a block diagram illustrating a third embodiment of the data acquisition section and a sixth embodiment of the vehicle-exterior-information detector.

FIG. 20 illustrates examples of configurations of a data acquisition section 102C that is a third embodiment of the data acquisition section 102 in the vehicle control system 100 of FIG. 1, and a vehicle-exterior-information detector 141F that is a sixth embodiment of the vehicle-exterior-information detector 141 in the vehicle control system 100 of FIG. 1. Note that a portion in the figure that corresponds to a portion in FIG. 2 is denoted by the same reference numeral as FIG. 2, and a description thereof is omitted as appropriate.

The data acquisition section 102C is similar to the data acquisition section 102A of FIG. 2 in including the camera 201, and is different from the data acquisition section 102A in including a millimeter-wave radar 811 instead of the millimeter-wave radar 202.

The vehicle-exterior-information detector 141F includes an information processor 831. The information processor 831 is similar to the information processor 211 of FIG. 2 in including the image processor 221, the geometric transformation section 223, and the object recognition section 224, and is different from the information processor 211 in that the signal processor 222 has been removed.

The millimeter-wave radar 811 includes a signal processor 821 that includes a function equivalent to the function of the signal processor 222. The signal processor 821 performs specified signal processing on millimeter-wave data to generate two types of millimeter-wave images that are a signal-intensity image and a speed image that indicate a result of sensing performed by the millimeter-wave radar 811. The signal processor 821 supplies the signal-intensity image and the speed image to the geometric transformation section 223.

As described above, millimeter-wave data may be transformed into millimeter-wave images in the millimeter-wave radar 811.

7. Seventh Embodiment

Next, a seventh embodiment of the present technology is described with reference to FIG. 21.

<Examples of Configurations of Data Acquisition Section 102D and Vehicle-Exterior-Information Detector 141G>

Figure 21:
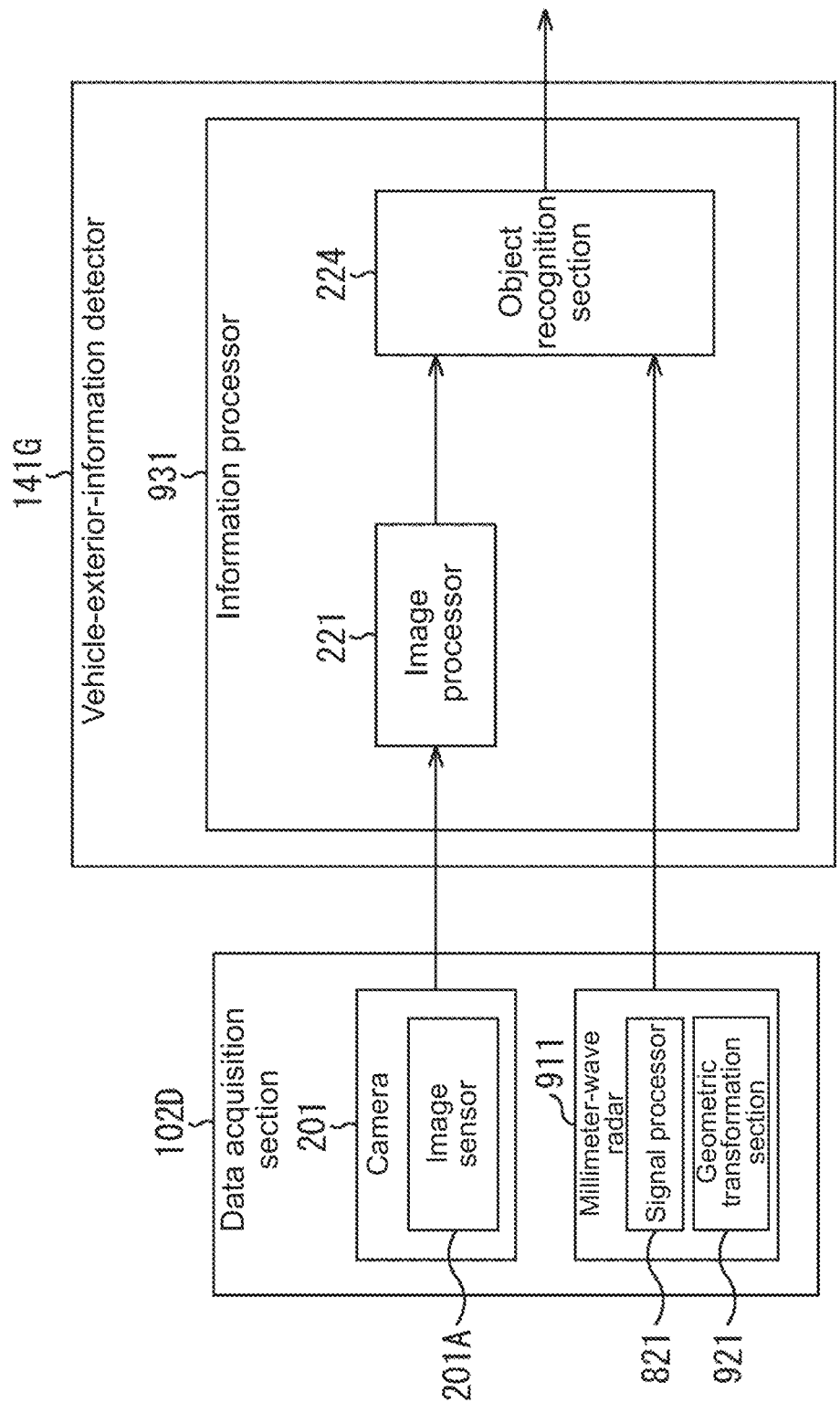
FIG. 21 is a block diagram illustrating a fourth embodiment of the data acquisition section and a seventh embodiment of the vehicle-exterior-information detector.
Figure 22:
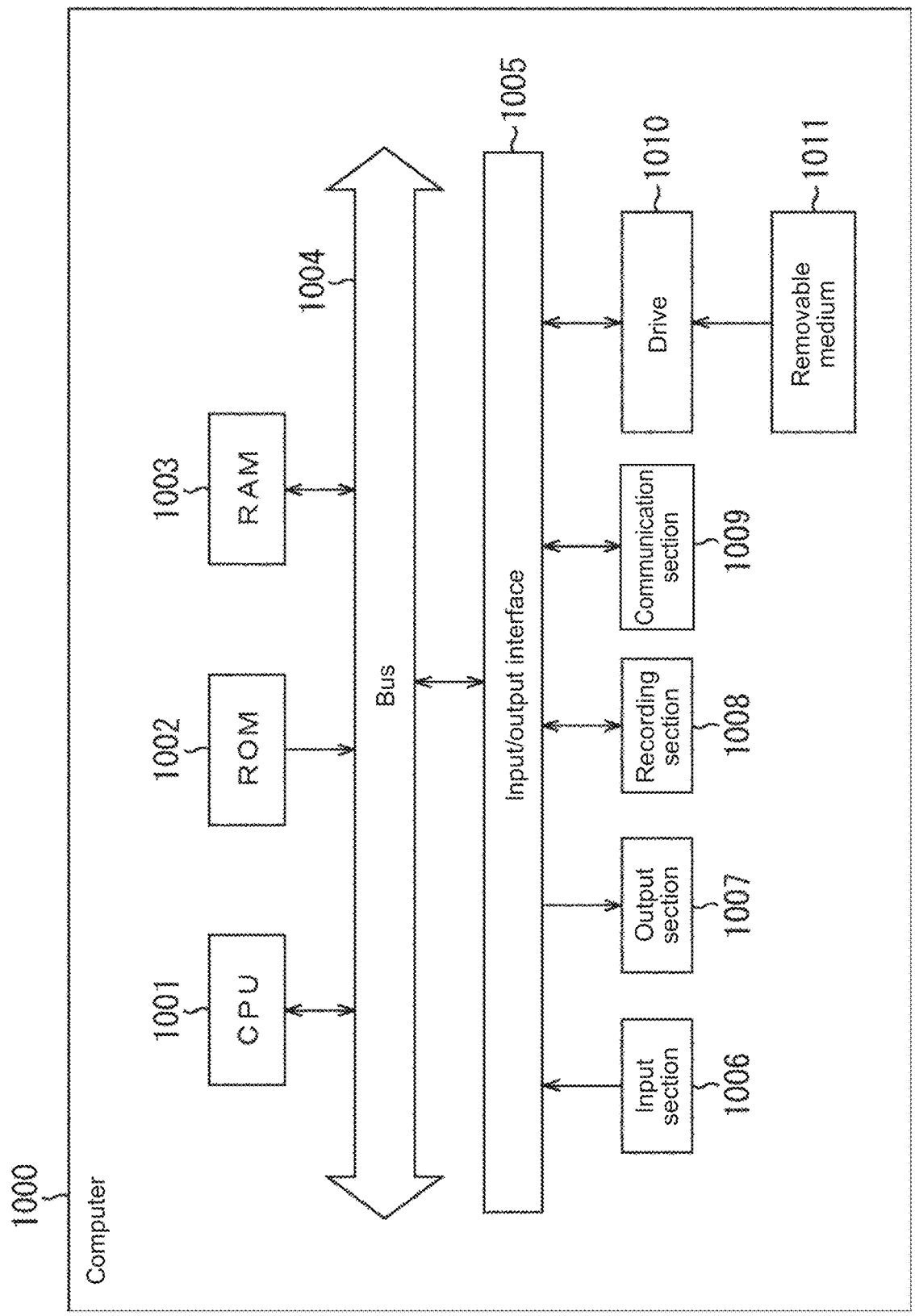
FIG. 22 illustrates an example of a configuration of a computer.

FIG. 21 illustrates examples of configurations of a data acquisition section 102D that is a fourth embodiment of the data acquisition section 102 in the vehicle control system 100 of FIG. 1, and a vehicle-exterior-information detector 141G that is a seventh embodiment of the vehicle-exterior-information detector 141 in the vehicle control system 100 of FIG. 1. Note that a portion in the figure that corresponds to a portion in FIG. 20 is denoted by the same reference numeral as FIG. 20, and a description thereof is omitted as appropriate.

The data acquisition section 102D is similar to the data acquisition section 102C of FIG. 20 in including the camera 201, and is different from the data acquisition section 102C in including a millimeter-wave radar 911 instead of the millimeter-wave radar 811.

The vehicle-exterior-information detector 141G includes an information processor 931. The information processor 931 is similar to the information processor 831 of FIG. 20 in including the image processor 221 and the object recognition section 224, and is different from the information processor 831 in that the geometric transformation section 223 has been removed.

In addition to the signal-processor 821, the millimeter-wave radar 911 includes a geometric transformation section 921 that includes a function equivalent to the function of the geometric transformation section 223.

The geometric transformation section 921 transforms the coordinate system of a signal-intensity image and a speed image from the coordinate system of a millimeter-wave image to the coordinate system of a captured image, and supplies the object recognition section 224 with a geometrically transformed signal-intensity image and a geometrically transformed speed image that are obtained by the geometric transformation.

As described above, millimeter-wave data may be transformed into millimeter-wave images and a geometric transformation may be performed on the millimeter-wave images in the millimeter-wave radar 911.

8. Modifications

Modifications of the embodiments of the present technology described above are described below.

The example in which a vehicle is a recognition target has been primarily described above. However, as described above, any object other than a vehicle may be a recognition target. For example, it is sufficient if leaning processing is performed on the object recognition model 251 using training data that includes correct answer data indicating a location of a target object to be recognized.

Further, the present technology is also applicable to the case of recognizing a plurality of types of objects. For example, it is sufficient if leaning processing is performed on the object recognition model 251 using training data that includes correct answer data indicating a location and a label (the type of target object) of each target object.

Furthermore, when a captured image has a size for which the object recognition section 251 can satisfactorily perform processing, the captured image may be directly input to the object recognition model 251 to perform processing of recognizing a target object.

The example of recognizing a target object situated ahead of the vehicle 10 has been described above. However, the present technology is also applicable to the case of recognizing a target object situated around the vehicle 10 in another direction, as viewed from the vehicle 10.

Further, the present technology is also applicable to the case of recognizing a target object around a mobile object other than a vehicle. For example, it is conceivable that the present technology could be applied to a mobile object such as a motorcycle, a bicycle, personal mobility, an airplane, a ship, construction machinery, and agricultural machinery (a tractor). Further, examples of the mobile object to which the present technology is applicable also include a mobile object, such as a drone and a robot, that is remotely operated by a user without the user getting on the mobile object.

Furthermore, the present technology is also applicable to the case of performing processing of recognizing a target object at a fixed place such as a monitoring system.

Moreover, the object recognition model 251 of FIG. 3 is merely an example, and a model other than the object recognition model 251 that is generated by machine learning may also be used.

Further, the present technology is also applicable to the case of performing processing of recognizing a target object by a camera (an image sensor) and LiDAR being used in combination.

Furthermore, the present technology is also applicable to the case of using a sensor that detects an object and is other than a millimeter-wave radar and LiDAR.

Moreover, for example, the second embodiment and the third to seventh embodiments may be combined. Further, for example, coordinate systems of all of the images may be transformed such that the coordinate systems of the respective images are matched to a new coordinate system that is different from the coordinate systems of the respective images.

9. Others

<Example of Configuration of Computer>

The series of processes described above can be performed using hardware or software. When the series of processes is performed using software, a program included in the software is installed on a computer. Here, examples of the computer include a computer incorporated into dedicated hardware, and a computer such as a general-purpose personal computer that is capable of performing various functions by various programs being installed thereon.

FIG. 18 is a block diagram of an example of a configuration of hardware of a computer that performs the series of processes described above using a program.

In the computer 1000, a central processing unit (CPU) 1001, a read only memory (ROM) 1002, and a random access memory (RAM) 1003 are connected to one another through a bus 1004.

Further, an input/output interface 1005 is connected to the bus 1004. An input section 1006, an output section 1007, a recording section 1008, a communication section 1009, and a drive 1010 are connected to the input/output interface 1005.

The input section 1006 includes, for example, an input switch, a button, a microphone, and an imaging element. The output section 1007 includes, for example, a display and a speaker. The recording section 1008 includes, for example, a hard disk and a nonvolatile memory. The communication section 1009 includes, for example, a network interface. The drive 1010 drives a removable medium 1011 such as a magnetic disk, an optical disk, a magneto-optical disk, or a semiconductor memory.

In the computer 1000 having the configuration described above, the series of processes described above is performed by the CPU 1001 loading, for example, a program recorded in the recording section 1008 into the RAM 1003 and executing the program via the input/output interface 1005 and the bus 1004.

For example, the program executed by the computer 1000 (the CPU 1001) can be provided by being recorded in the removable medium 1011 serving as, for example, a package medium. Further, the program can be provided via a wired or wireless transmission medium such as a local area network, the Internet, or digital satellite broadcasting.

In the computer 1000, the program can be installed on the recording section 1008 via the input/output interface 1005 by the removable medium 1011 being mounted on the drive 1010. Further, the program can be received by the communication section 1009 via the wired or wireless transmission medium to be installed on the recording section 1008. Moreover, the program can be installed in advance on the ROM 1002 or the recording section 1008.

Note that the program executed by the computer may be a program in which processes are chronologically performed in the order of the description herein, or may be a program in which processes are performed in parallel or a process is performed at a necessary timing such as a timing of calling.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both systems.

Furthermore, the embodiment of the present technology is not limited to the examples described above, and various modifications may be made thereto without departing from the scope of the present technology.

For example, the present technology may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

<Example of Combination of Configurations>

The present technology may also take the following configurations.

(1) An information processing apparatus, including:
   a geometric transformation section that transforms at least one of a captured image or a sensor image to match coordinate systems of the captured image and the sensor image, the captured image being obtained by an image sensor, the sensor image indicating a sensing result of a sensor of which a sensing range at least partially overlaps a sensing range of the image sensor; and
   an object recognition section that performs processing of recognizing a target object on the basis of the captured image and sensor image of which the coordinate systems have been matched to each other.

(2) The information processing apparatus according to (1), in which
the geometric transformation section transforms the sensor image into a geometrically transformed sensor image of which a coordinate system is identical to the coordinate system of the captured image, and
the object recognition section performs the processing of recognizing the target object on the basis of the captured image and the geometrically transformed sensor image.

(3) The information processing apparatus according to (2), in which
the object recognition section performs the processing of recognizing the target object using an object recognition model obtained by machine learning.

(4) The information processing apparatus according to (3), in which
the object recognition model is caused to perform learning using training data that includes input data and correct answer data, the input data including the captured image and the geometrically transformed sensor image, the correct answer data indicating a location of an object in the captured image.

(5) The information processing apparatus according to (4), in which
the object recognition model is a model using a deep neural network.

(6) The information processing apparatus according to (5), in which
the object recognition model includes
a first convolutional neural network that extracts feature amounts of the captured image and the geometrically transformed sensor image, and
a second convolutional neural network that recognizes the target object on the basis of the feature amounts of the captured image and the geometrically transformed sensor image.

(7) The information processing apparatus according to any one of (2) to (6), in which
the sensor includes a millimeter-wave radar, and
the sensor image indicates a location of an object off which a transmission signal from the millimeter-wave radar is reflected.

(8) The information processing apparatus according to (7), in which
the coordinate system of the sensor image is defined by an axis that represents a direction in which the transmission signal is spread out in a planar manner, and by an axis that represents an optical-axis direction of the millimeter-wave radar.

(9) The information processing apparatus according to (7) or (8), in which
the geometric transformation section transforms a first sensor image and a second sensor image into a first geometrically transformed sensor image and a second geometrically transformed sensor image, respectively, the first sensor image indicating a location of the object and intensity of a signal reflected off the object, the second sensor image indicating the location and a speed of the object, and
the object recognition section performs the processing of recognizing the target object on the basis of the captured image, the first geometrically transformed sensor image, and the second geometrically transformed sensor image.

(10) The information processing apparatus according to any one of (2) to (9), further including
an image processor that generates a low-resolution image obtained by reducing resolution of the captured image, and a crop image obtained by cutting out a portion of the captured image, in which
the object recognition section performs the processing of recognizing the target object on the basis of the low-resolution image, the crop image, and the geometrically transformed sensor image.

(11) The information processing apparatus according to (10), in which
the object recognition section includes
a first object recognition section that performs processing of recognizing the target object on the basis of the low-resolution image and the geometrically transformed sensor image, and
a second object recognition section that performs processing of recognizing the target object on the basis of the crop image and the geometrically transformed sensor image, and
the information processing apparatus further includes a combiner that combines a result of the recognition of the target object that is performed by the first object recognition section, and a result of the recognition of the target object that is performed by the second object recognition section.

(12) The information processing apparatus according to (10) or (11), in which
the image sensor and the sensor perform sensing with respect to surroundings of a vehicle, and
the image processor performs the cutout to obtain the crop image on the basis of a vanishing point of a road in the captured image.

(13) The information processing apparatus according to (1), in which
the geometric transformation section transforms the captured image into a geometrically transformed captured image of which a coordinate system is identical to the coordinate system of the sensor image, and
the object recognition section performs the processing of recognizing the target object on the basis of the geometrically transformed captured image and the sensor image.

(14) The information processing apparatus according to any one of (1) to (13), in which
the sensor includes at least one of a millimeter-wave radar or light detection and ranging (LiDAR), and
the sensor image includes at least one of an image indicating a location of an object off which a transmission signal from the millimeter-wave radar is reflected, or group-of-points data obtained by the LiDAR.

(15) The information processing apparatus according to any one of (1) to (14), in which
the image sensor and the sensor perform sensing with respect to surroundings of a mobile object, and
the object recognition section performs the processing of recognizing the target object in the surroundings of the mobile object.

(16) An information processing method that is performed by an information processing apparatus, the information processing method including:
transforming at least one of a captured image or a sensor image, and matching coordinate systems of the captured image and the sensor image, the captured image being obtained by an image sensor, the sensor image indicating a sensing result of a sensor of which a sensing range at least partially overlaps a sensing range of the image sensor; and performing processing of recognizing a target object on the basis of the captured image and sensor image of which the coordinate systems have been matched to each other.

(17) A program for causing a computer to perform a process including:

transforming at least one of a captured image or a sensor image, and matching coordinate systems of the captured image and the sensor image, the captured image being obtained by an image sensor, the sensor image indicating a sensing result of a sensor of which a sensing range at least partially overlaps a sensing range of the image sensor; and performing processing of recognizing a target object on the basis of the captured image and sensor image of which the coordinate systems have been matched to each other.

(18) A mobile-object control apparatus, including:

a geometric transformation section that transforms at least one of a captured image or a sensor image to match coordinate systems of the captured image and the sensor image, the captured image being obtained by an image sensor that captures an image of surroundings of a mobile object, the sensor image indicating a sensing result of a sensor of which a sensing range at least partially overlaps a sensing range of the image sensor;

an object recognition section that performs processing of recognizing a target object on the basis of the captured image and sensor image of which the coordinate systems have been matched to each other; and a movement controller that controls movement of the mobile object on the basis of a result of the recognition of the target object.

(19) A mobile object, including:

an image sensor;

a sensor of which a sensing range at least partially overlaps a sensing range of the image sensor;

a geometric transformation section that transforms at least one of a captured image or a sensor image to match coordinate systems of the captured image and the sensor image, the captured image being obtained by the image sensor, the sensor image indicating a sensing result of the sensor;

an object recognition section that performs processing of recognizing a target object on the basis of the captured image and sensor image of which the coordinate systems have been matched to each other; and a movement controller that controls movement of the mobile object on the basis of a result of the recognition of the target object.

Note that the effects described herein are not limitative but are merely illustrative, and other effects may be provided.

REFERENCE SIGNS LIST 10 vehicle
100 vehicle control system
102, 102A to 102D data acquisition section
107 drivetrain controller
108 drivetrain system
135 movement controller
141, 141A to 141G vehicle-exterior-information detector
201 camera
201A image sensor
202 millimeter-wave radar
211 information processor
221 image processor
222 signal processor
223 geometric transformation section
251 object recognition section
251 object recognition model
261 feature-amount extraction section
262 recognition section
301 learning system
316 training data generator
317 learning section
401 information processor
421 image processor
422 object recognition section
423 combiner
431a, 431b object recognition section
501 LiDAR
511 information processor
521 signal processor
522 geometric transformation section
523 object recognition section
611 information processor
621 geometric transformation section
622 object recognition section
711 information processor
721, 722 geometric transformation section
723 object recognition section
811 millimeter-wave radar
821 signal processor
831 information processor
911 millimeter-wave radar
921 geometric transformation section

The invention claimed is:

1. An information processing apparatus, comprising:

a geometric transformation section configured to produce a geometrically transformed sensor image by transforming a sensor image to have an identical coordinate system as a captured image, the captured image being obtained by an image sensor, the sensor image indicating a sensing result of a sensor of which a sensing range at least partially overlaps a sensing range of the image sensor, wherein the sensor includes a millimeter-wave radar, and the sensor image indicates a location of an object off which a transmission signal from the millimeter-wave radar is reflected, and wherein a coordinate system of the sensor image is defined by an axis that represents a direction in which the transmission signal is spread out in a planar manner, and by an axis that represents an optical-axis direction of the millimeter-wave radar; and an object recognition section configured to recognize a target object on a basis of the captured image and the geometrically transformed sensor image, using an object recognition model obtained by machine learning, the object recognition section comprising:

a feature-amount extraction section configured to receive at least one of a geometrically transformed captured image, the geometrically transformed sensor image, the captured image, and the sensor image and generate feature amounts of at least one of the geometrically transformed captured image, the geometrically transformed sensor image, the captured image and the sensor image; and
a recognition section configured to receive feature amounts from the feature-amount extraction section and recognize the target object;
wherein the object recognition model includes:
the feature-amount extraction section including a first convolutional neural network that extracts feature amounts of the captured image and the geometrically transformed sensor image; and
the recognition section including a second convolutional neural network that recognizes the target object on a basis of the feature amounts of the captured image and the geometrically transformed sensor image.

2. The information processing apparatus according to claim 1, wherein
the object recognition model is caused to perform learning using training data that includes input data and correct answer data, the input data including the captured image and the geometrically transformed sensor image, the correct answer data indicating a location of an object in the captured image.

3. The information processing apparatus according to claim 2, wherein
the object recognition model is a model using a deep neural network.

4. The information processing apparatus according to claim 1, wherein
the geometric transformation section transforms a first sensor image and a second sensor image into a first geometrically transformed sensor image and a second geometrically transformed sensor image, respectively, the first sensor image indicating a location of the object and intensity of a signal reflected off the object, the second sensor image indicating the location and a speed of the object, and
the object recognition section is configured to recognize the target object on a basis of the captured image, the first geometrically transformed sensor image, and the second geometrically transformed sensor image.

5. The information processing apparatus according to claim 1, further comprising
an image processor that generates a low-resolution image obtained by reducing resolution of the captured image, and a crop image obtained by cutting out a portion of the captured image, wherein
the object recognition section is configured to recognize the target object on a basis of the low-resolution image, the crop image, and the geometrically transformed sensor image.

6. The information processing apparatus according to claim 5, wherein
the object recognition section includes
a first object recognition section that is configured to recognize the target object on a basis of the low-resolution image and the geometrically transformed sensor image, and
a second object recognition section that is configured to recognize the target object on a basis of the crop image and the geometrically transformed sensor image, and
the information processing apparatus further comprises a combiner that combines a result of the recognition of the target object that is performed by the first object recognition section, and a result of the recognition of the target object that is performed by the second object recognition section.

7. The information processing apparatus according to claim 5, wherein
the image sensor and the sensor perform sensing with respect to surroundings of a vehicle, and
the image processor performs a cutout to obtain the crop image on a basis of a vanishing point of a road in the captured image.

8. The information processing apparatus according to claim 1, wherein
the geometric transformation section transforms the captured image into the geometrically transformed captured image of which the coordinate system of the geometrically transformed captured image is identical to the coordinate system of the sensor image, and
the object recognition section is configured to recognize the target object on a basis of the geometrically transformed captured image and the sensor image.

9. The information processing apparatus according to claim 1, wherein
the sensor includes at least one of a millimeter-wave radar or light detection and ranging (LiDAR), and
the sensor image includes at least one of an image indicating a location of an object off which a transmission signal from the millimeter-wave radar is reflected, or group-of-points data obtained by the LiDAR.

10. The information processing apparatus according to claim 1, wherein
the image sensor and the sensor perform sensing with respect to surroundings of a mobile object, and
the object recognition section is configured to recognize the target object in the surroundings of the mobile object.

11. An information processing method that is performed by an information processing apparatus, the information processing method comprising:
producing a geometrically transformed sensor image by transforming a sensor image to have an identical coordinate system as a captured image, the captured image being obtained by an image sensor, the sensor image indicating a sensing result of a sensor of which a sensing range at least partially overlaps a sensing range of the image sensor, the sensor including a millimeter-wave radar and the sensor image indicating a location of an object off which a transmission signal from the millimeter-wave radar is reflected, wherein transforming the sensor image to have the identical coordinate system as the captured image comprises defining a coordinate system of the sensor image by an axis that represents a direction in which the transmission signal is spread out in a planar manner, and by an axis that represents an optical-axis direction in the millimeter-wave radar;
generating feature amounts of at least one of a geometrically transformed captured image, the geometrically transformed sensor image, the captured image and the sensor image; and
recognizing a target object on a basis of the feature amounts of the geometrically transformed sensor image, the captured image and the sensor image, using an object recognition model obtained by machine learning wherein using the object recognition model includes:

generating feature amounts using a first convolutional neural network that extracts feature amounts of the captured image and the geometrically transformed sensor image; and recognizing the target object using a second convolutional neural network on a basis of the feature amounts of the captured image and the geometrically transformed sensor image.

12. At least one non-transitory computer-removable medium storing a program that, when executed by at least one computer, causes the at least one computer to perform a process comprising:

producing a geometrically transformed sensor image by transforming a sensor image to have an identical coordinate system as a captured image, the captured image being obtained by an image sensor, the sensor image indicating a sensing result of a sensor of which a sensing range at least partially overlaps a sensing range of the image sensor, the sensor including a millimeter-wave radar and the sensor image indicating a location of an object off which a transmission signal from the millimeter-wave radar is reflected, wherein transforming the sensor image to have the identical coordinate system as the captured image comprises defining a coordinate system of the sensor image by an axis that represents a direction in which the transmission signal is spread out in a planar manner, and by an axis that represents an optical-axis direction in the millimeter-wave radar;

generating feature amounts of at least one of a geometrically transformed captured image, the geometrically transformed sensor image, the captured image and the sensor image; and recognizing a target object on a basis of the feature amounts of the geometrically transformed sensor image, the captured image and the sensor image, using an object recognition model obtained by machine learning wherein using the object recognition model includes:

generating feature amounts using a first convolutional neural network that extracts feature amounts of the captured image and the geometrically transformed sensor image; and recognizing the target objecting using a second convolutional neural network on a basis of the feature amounts of the captured image and the geometrically transformed sensor image.

13. A mobile-object control apparatus, comprising:

a geometric transformation section configured to produce a geometrically transformed sensor image by transforming a sensor image to have an identical coordinate system as a captured image, the captured image being obtained by an image sensor that captures an image of surroundings of a mobile object, the sensor image indicating a sensing result of a sensor of which a sensing range at least partially overlaps a sensing range of the image sensor, wherein the sensor includes a millimeter-wave radar, and the sensor image indicates a location of an object off which a transmission signal from the millimeter-wave radar is reflected, and wherein a coordinate system of the sensor image is defined by an axis that represents a direction in which the transmission signal is spread out in a planar manner, and by an axis that represents an optical-axis direction of the millimeter-wave radar;

an object recognition section configured to recognize a target object on a basis of the captured image and the geometrically transformed sensor image, using an object recognition model obtained by machine learning, the object recognition section comprising:

a feature-amount extraction section configured to receive at least one of a geometrically transformed captured image, the geometrically transformed sensor image, the captured image, and the sensor image and generate feature amounts of at least one of the geometrically transformed captured image, the geometrically transformed sensor image, the captured image and the sensor image; and a recognition section configured to receive feature amounts from the feature-amount extraction section and recognize the target object;

and a movement controller that controls movement of the mobile object on a basis of a result of the recognition of the target object, wherein the object recognition model includes:

the feature-amount extraction section including a first convolutional neural network that extracts feature amounts of the captured image and the geometrically transformed sensor image; and the recognition section including a second convolutional neural network that recognizes the target object on a basis of the feature amounts of the captured image and the geometrically transformed sensor image.

14. A mobile object, comprising:

an image sensor;

a sensor of which a sensing range at least partially overlaps a sensing range of the image sensor;

a geometric transformation section configured to produce a geometrically transformed sensor image by transforming a sensor image to have an identical coordinate system as a captured image, the captured image being obtained by the image sensor, the sensor image indicating a sensing result of the sensor, wherein the sensor includes a millimeter-wave radar, and the sensor image indicates a location of an object off which a transmission signal from the millimeter-wave radar is reflected, wherein a coordinate system of the sensor image is defined by an axis that represents a direction in which the transmission signal is spread out in a planar manner, and by an axis that represents an optical-axis direction of the millimeter-wave radar;

an object recognition section configured to recognize a target object on a basis of the captured image and the geometrically transformed sensor image, using an object recognition model obtained by machine learning, the object recognition section comprising:

a feature-amount extraction section configured to receive at least one of a geometrically transformed captured image, the geometrically transformed sensor image, the captured image, and the sensor image and generate feature amounts of at least one of the geometrically transformed captured image, the geometrically transformed sensor image, the captured image and the sensor image; and a recognition section configured to receive feature amounts from the feature-amount extraction section and recognize the target object;

and a movement controller that controls movement of the mobile object on a basis of a result of the recognition of the target object, wherein the object recognition model includes:

the feature-amount extraction section including a first convolutional neural network that extracts feature amounts of the captured image and the geometrically transformed sensor image; and the recognition section including a second convolutional neural network that recognizes the target object on a basis of the feature amounts of the captured image and the geometrically transformed sensor image.

\* \* \* \* \*